(12) United States Patent
Qu et al.

(10) Patent No.: US 10,715,881 B2
(45) Date of Patent: Jul. 14, 2020

(54) PROVIDING INTERACTIVE ELEMENTS WITH A LIVE VIDEO PRESENTATION

(71) Applicant: Facebook, Inc., Menlo Park, CA (US)

(72) Inventors: Xiaoyin Qu, Palo Alto, CA (US); He Li, Mountain View, CA (US); Renyu Liu, Mountain View, CA (US); Liping Chen, Fremont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 49 days.

(21) Appl. No.: 15/340,736

(22) Filed: Nov. 1, 2016

(65) Prior Publication Data
US 2018/0124477 A1 May 3, 2018

(51) Int. Cl.
*H04N 21/8545* (2011.01)
*H04N 21/6583* (2011.01)
*H04N 21/2187* (2011.01)
*H04N 21/472* (2011.01)
*H04N 21/845* (2011.01)
*H04N 21/45* (2011.01)
*H04N 21/2362* (2011.01)
*H04N 21/431* (2011.01)
*H04N 21/4788* (2011.01)

(52) U.S. Cl.
CPC ..... *H04N 21/8545* (2013.01); *H04N 21/2187* (2013.01); *H04N 21/2362* (2013.01); *H04N 21/431* (2013.01); *H04N 21/4532* (2013.01); *H04N 21/472* (2013.01); *H04N 21/4788* (2013.01); *H04N 21/6583* (2013.01); *H04N 21/8456* (2013.01)

(58) Field of Classification Search
CPC ............. H04N 21/40; H04N 21/42204; H04N 21/8545; H04N 21/2187; H04N 21/2362; H04N 21/431; H04N 21/4532; H04N 21/472; H04N 21/4788; H04N 21/6583; H04N 21/8456
USPC .................................................... 725/44, 135
See application file for complete search history.

(56) References Cited

U.S. PATENT DOCUMENTS

| | | | |
|---|---|---|---|
| 8,713,618 B1* | 4/2014 | Kuznetsov | H04L 29/06027 725/38 |
| 8,754,924 B1* | 6/2014 | Shane | H04L 12/1827 348/14.05 |
| 8,838,713 B2* | 9/2014 | Moore | H04N 21/4333 455/412.2 |
| 10,021,458 B1* | 7/2018 | Taylor | H04N 21/47815 |
| 2013/0347046 A1* | 12/2013 | Bluvband | G06F 3/005 725/109 |
| 2014/0137144 A1* | 5/2014 | Jarvenpaa | H04N 21/25891 725/13 |

(Continued)

*Primary Examiner* — James R Sheleheda
*Assistant Examiner* — Franklin S Andramuno
(74) *Attorney, Agent, or Firm* — Keller Jolley Preece

(57) ABSTRACT

The present disclosure is directed toward systems and methods for providing a call to action in connection with a live video stream. For example, systems and methods described herein enable a broadcaster to configure one or more benefits and one or more calls to action. Systems and methods described herein further provide the one or more calls to action in connection with a live video stream and based on the broadcaster's configurations. In response to a live video stream viewer correctly interacting with a provided call to action, systems and methods described herein provide a benefit to the viewer.

20 Claims, 12 Drawing Sheets

(56) References Cited

U.S. PATENT DOCUMENTS

| | | | |
|---|---|---|---|
| 2014/0223298 A1* | 8/2014 | Kim | G06F 3/04845 |
| | | | 715/708 |
| 2016/0007052 A1* | 1/2016 | Haitsuka | H04N 21/2407 |
| | | | 725/115 |
| 2016/0217328 A1* | 7/2016 | Yanai | G06K 9/22 |
| 2016/0277802 A1* | 9/2016 | Bernstein | H04N 21/4788 |

* cited by examiner

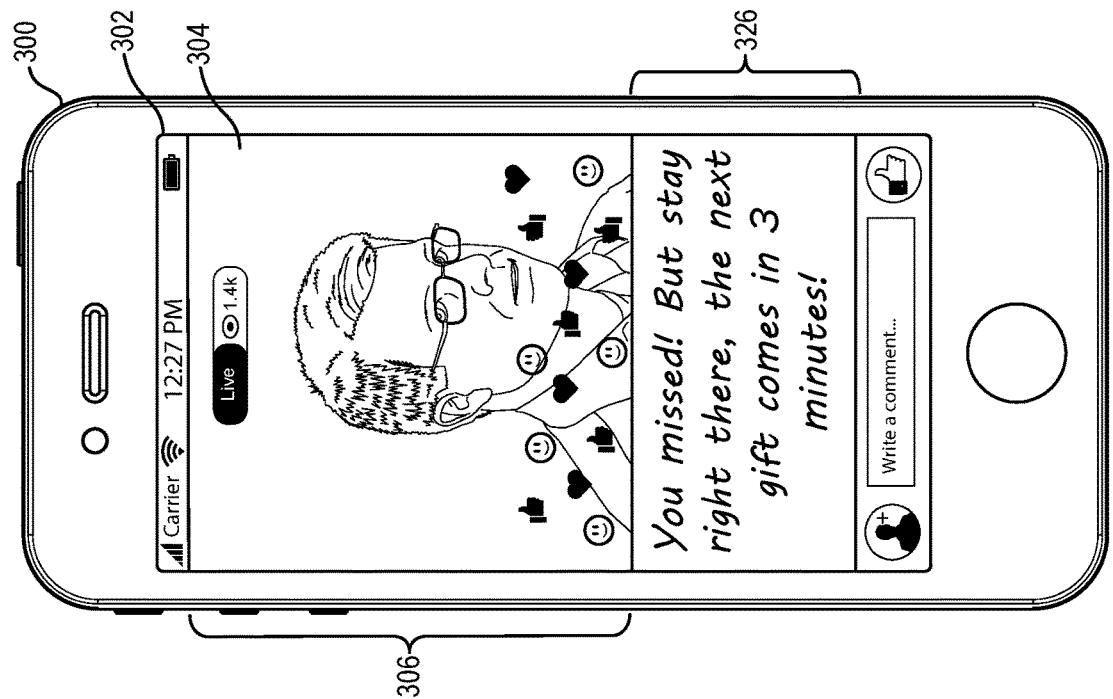
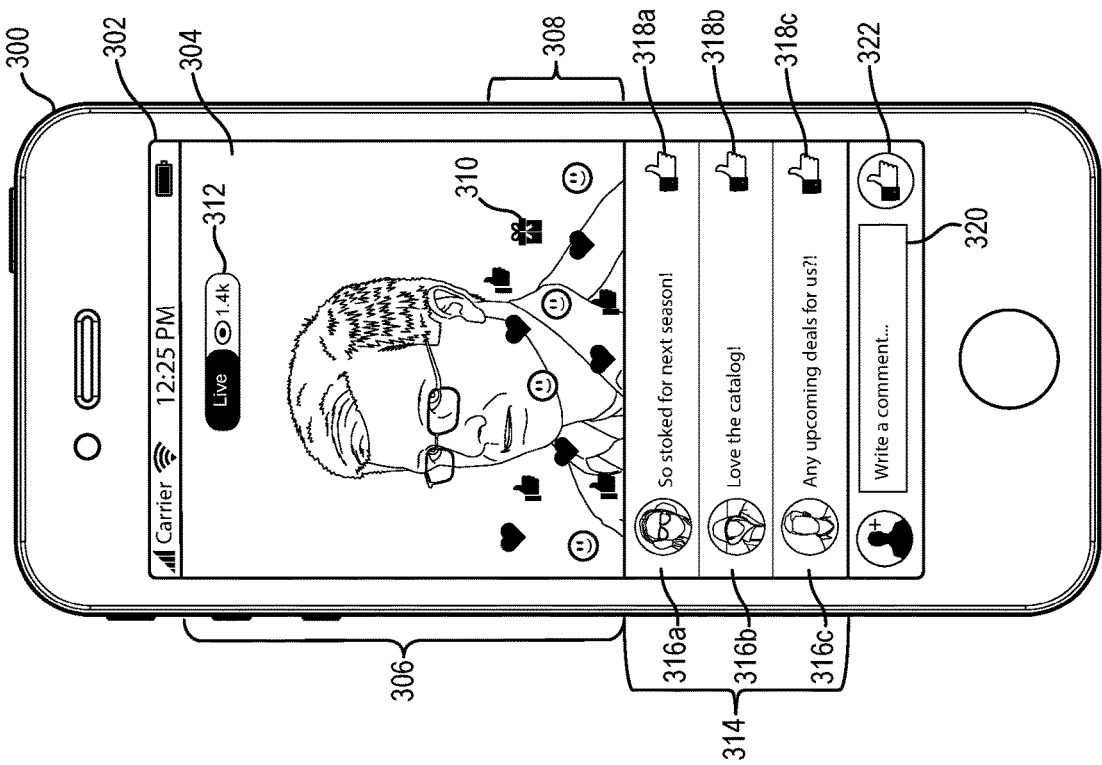
Fig. 3B
Fig. 3A

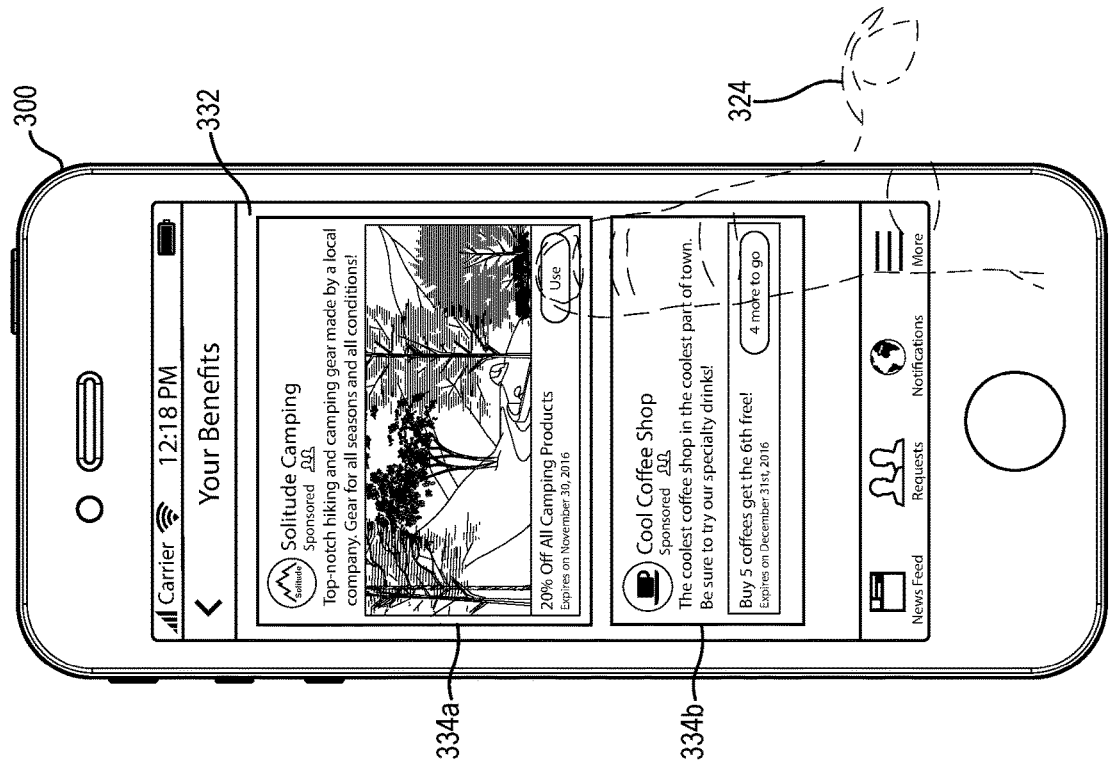
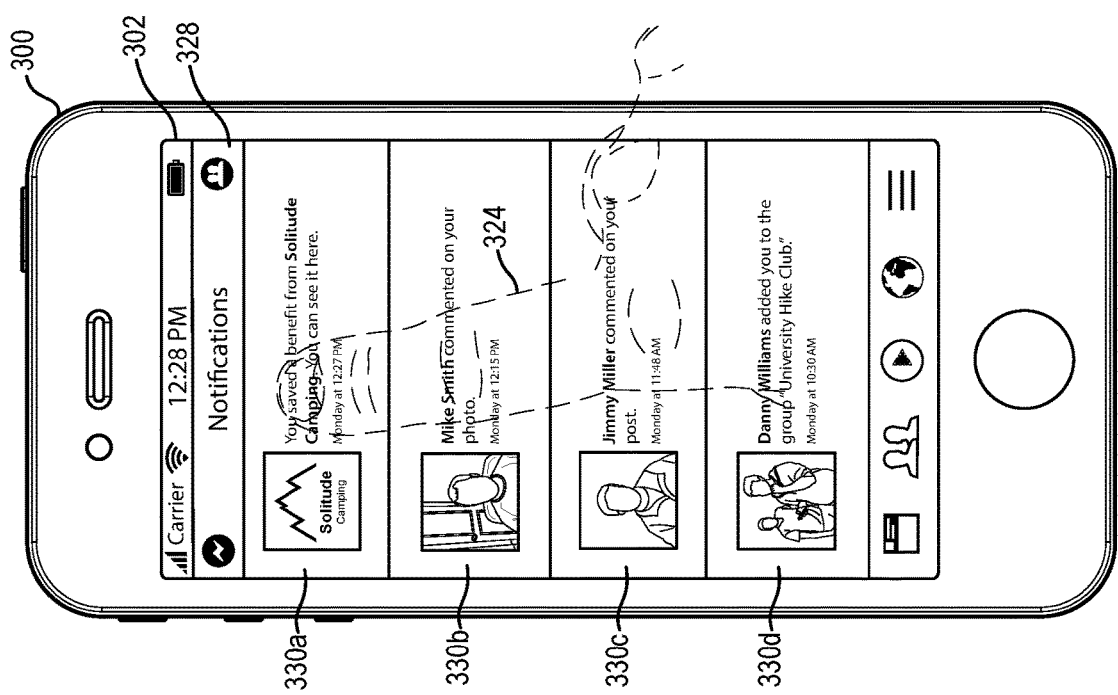
Fig. 3F
Fig. 3E

PROVIDING INTERACTIVE ELEMENTS WITH A LIVE VIDEO PRESENTATION

BACKGROUND

Video communications are an increasingly popular method of connecting via a social networking system. For example, where social networking system users were once limited to only written electronic communications, they can now communicate electronically with a video taken from a personal computing device, such as a smart phone. Social networking systems also enable users to provide live video streams as a means of communicating with other social networking system co-users. To illustrate, a social networking system user can broadcast a live video stream, captured by a camera incorporated within a user's smartphone, to one or more social networking system co-users.

Businesses, newscasters, politicians, and other public figures often leverage live video stream capabilities in order to quickly communicate with large audiences of social networking system users. However, in a live video scenario, the communication channel is one-way, and a broadcaster generally has no feedback on how well his audience is engaging with the live video stream. In other words, the with many conventional live video broadcasting systems, a broadcaster generally does not know whether members of the audience are actually engaged with the live video stream.

Similarly, audience members receiving a live video stream generally have no way to provide feedback to or interact with the broadcaster of the live video stream. For example, conventional live video broadcasting systems generally fail to allow a user watching a live video stream to interact with the broadcaster. Additionally, with conventional systems, the user watching the live video stream typically has no indication as to the level of engagement of other social networking system users watching the same live video stream. Accordingly, each member of the live video stream audience essentially views the live video stream in a vacuum.

Thus, the above-described limitations of conventional systems generally prohibit live video stream broadcasters from influencing the engagement level of the live video stream audience, and similarly, prohibit viewing members from more fully engaging with the broadcaster or other viewing members of the live video stream.

SUMMARY

One or more embodiments described herein provide benefits and/or solve one or more of the foregoing or other limitations and disadvantages in the art with systems and methods for providing calls to action in combination with providing live video streams. For example, in one or more embodiments, the systems and methods enable a broadcaster (e.g., a user providing a live video stream) to configure a call to action to use in association with a live video stream. Accordingly, during the broadcast of a live video stream, the systems and methods provide the configured call to action such that a call-to-action element is provided for display to an audience member along with the live video stream (e.g., the call-to-action element overlays the presentation of the live video stream). Moreover, various embodiments of the systems and methods allow audience members to interact with the call-to-action element to increase audience members' engagement with the live video stream and to provide the broadcaster with feedback as to the engagement level of audience members.

In order to incentivize viewers of the live video stream to interact with a call to action, one or more embodiments includes systems and methods that enable a broadcaster to provide a benefit to a viewer based on a viewer interacting with a call-to-action element. For example, a broadcaster can provide various inputs that define various call-to-action settings that define how and when to provide a benefit to a viewer based on the viewer interacting with a call-to-action element. Moreover, based on a viewer interaction, the systems and methods associate the awarded offer with the viewer's social networking system profile to allow the viewer to redeem the offer at a later time. In this way, the viewer can interact with the call to action, receive a benefit, and also continue viewing the live video stream without interruption.

In addition to providing a benefit associated with a call to action, one or more embodiments further allow a broadcaster to incentivize viewer engagement of a live video stream by defining various triggers settings that control when a call to action is deployed within a live video broadcast. For instance, a broadcaster can define a trigger setting to deploy a call to action based on the live video stream reaching a defined number of viewers, a defined number of "likes," a defined number of "shares," or other similar viewer engagement levels. Accordingly, the systems and methods allow a broadcaster to encourage viewers to continue watching the live video stream, "like" the live video stream, and/or share the live video stream by indicating that a call to action with one or more benefits will be deployed upon reaching a particular viewer engagement level. Accordingly, the systems and methods provide a call to action with various customizable features that allow a broadcaster to directly increase viewer engagement both on an individual viewer basis as well as on a total number of viewers.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which:

FIGS. 3A-3G illustrate a series of graphical user interfaces of the call-to-action system for providing a call-to-action element with a live vide stream in accordance with one or more embodiments;

DETAILED DESCRIPTION

Figure 1:
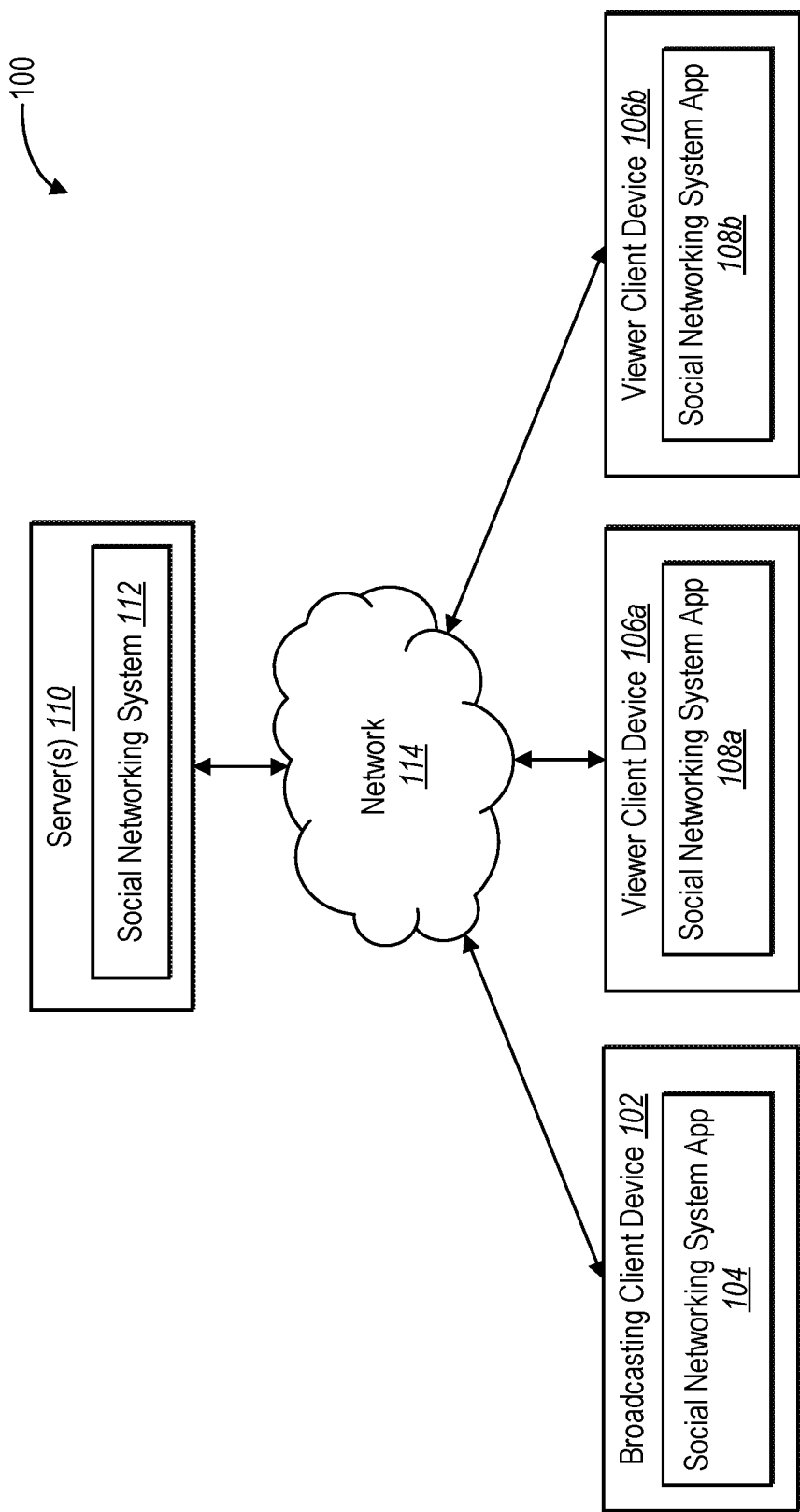
FIG. 1 illustrates a schematic diagram of a call-to-action system in accordance with one or more embodiments.

One or more embodiments described herein provide benefits and/or solve one or more of the foregoing or other problems in the art with systems and methods for providing a call to action during while provide a live video stream presentation. For example, a call-to-action system enables a broadcaster (e.g., a user of a social networking system broadcasting a live video) to configure a call to action to provide to viewers in combination with a live video stream. In one or more embodiments, the call-to-action system associates the call to action with a benefit to incentivize viewers to engage with the live video stream and interact with the call to action. In further embodiments, the call-to-action system also incentivizes viewer engagement by associating a call to action trigger (e.g., determining when to deploy a call to action) with viewer engagement levels (e.g., number of viewers, number of "likes," etc.).

As used herein, a "call to action" refers to one or more elements, settings, and/or characteristics that define or are associated with a call-to-action element that provokes an action from one or more users. For instance, a call to action can include various call-to-action settings and definitions that the call-to-action system uses to determine the behavior of a call to action, such as settings and definitions associated with triggers, characteristics, benefits, and/or other features, as will be described in addition detail below. In one or more embodiments, the various call-to-action settings define a call-to-action element (e.g., an interactive display element) that the call-to-action system provides simultaneously with a live video stream presentation.

For example, the call-to-action system provides a call-to-action element as a floating graphic overlaid the live stream video. Moreover, and based on the various call-to-action settings and definitions, in response to a viewer interacting with a call-to-action element, some embodiments of the call-to-action system provide a benefit to the viewer. As used herein, a "benefit" refers to something of value that the call-to-action system awards to a user. A benefit may correspond to a particular a product, service, merchant, business or other organization. For example, a benefit can be an offer, a credit, virtual currency, a file download, an electronic ticket, a coupon, an opportunity to claim a prize, and so forth. Thus, the call-to-action system produces interactive call-to-action elements that can create an engaging format that, when provided in combination with the live video stream, incentivizes a viewer to remain engaged with a live video stream presentation.

To illustrate various example features and functionality of the call-to-action system, an example embodiment can include a social networking system user (e.g., a broadcaster) interacting with the call-to-action system to provide various user inputs that define settings associated with a call to action. For instance, the broadcaster can provide various user inputs to define a particular benefit for a call to action. For example, the benefit may be an offer from a merchant (e.g., "10% off all dog toys this week," "Free shipping on all baby products," "Buy 5 coffees get your $6^{th}$ coffee free!").

In addition to defining a benefit, one or more embodiments of the call-to-action system provide the broadcaster with an opportunity to define various call-to-action settings corresponding to a call to action. In at least one embodiment, the broadcaster can configure a wide range of settings related to the call to action including, but not limited to, the benefit tied to the call to action, the type of user interaction associated with a call-to-action element (e.g., tap a floating display element, follow swipe directions, etc.), the appearance of the call-to-action element, a difficulty level associated with a viewer successfully interacting with a call to action, when to deploy a call to action, and so forth. For example, the broadcaster may manually trigger the call to action, or the call-to-action system may trigger the call to action based on detecting the satisfaction of a predefined criteria.

At some point after configuring a call to action, the broadcaster can initiate a live video stream. In particular, the social networking system enables a user to initiate a live video stream captured by a camera of a personal computing device (e.g., a smartphone, a laptop), or some other type of video camera connected to a network-enabled computing device. The live video stream depicts a non-time-shifted video (e.g., a substantially real-time video depending on network and device processor and communication speed characteristics). While providing a live video stream presentation, the call-to-action system can provide, to the viewing users, a call-to-action element corresponding to the predefined call to action. As mentioned above, in at least one embodiment, the call to action provides a call-to-action element that appears to float over the live video stream presentation. In response to detecting that a viewer successfully interacts with the call-to-action element in a predefined manner, the call-to-action system provides a benefit to the viewer.

To illustrate, a broadcaster may configure a call to action to award an offer for $5 off a sandwich at a restaurant based on a viewer tapping a call-to-action element. The broadcaster may be directly affiliated with the restaurant, or alternatively, the restaurant can be a sponsor of the broadcaster, as will be further described below. In addition, the call to action may include a trigger setting that deploys a call-to-action element after a defined number of viewers are watching the live video stream. Accordingly, after the defined number of viewers join the live video stream presentation, the call-to-action system triggers the call-to-action element, which may include a selectable birthday present image (e.g., a GIF, a JPEG, etc.) floating into one side of the display of the live video stream and moving toward the other side of the display.

While the call-to-action system provides the call-to-action element, any of the viewers may attempt to interact with (e.g., tap on) the call-to-action element while the call-to-action element appears to float across the live video stream presentation. The call-to-action system can receive one or more indications of a user interaction with the call-to-action element from one or more client devices associated with any the viewers. Based on the one or more indications of a user interaction, the call-to-action system can determine one or more viewers to award the predefined benefit (e.g., the $5 off a sandwich). For example, based on the call-to-action settings, the call-to-action system can determine a first viewer who successfully tapped on the call-to-action element, and accordingly, award the first viewer the benefit.

Upon determining a viewer qualified for a benefit associated with a call to action, the call-to-action system can further provide the viewer with a notification of the benefit during the presentation of the live video stream. In particular, in one or more embodiments, the call-to-action system provides a notification in a manner that the live video presentation is not interrupted, yet at the same time, the viewer is made aware of the benefit. This is accomplished by providing a notification within an area of a graphical user interface that does not include the presentation of the live video feed. Moreover, in addition to providing a benefit notification to a viewer during the live video presentation, the call-to-action system can further associate the benefit with the viewer's social networking system account such that the viewer can easily find and redeem the benefit. Accordingly, the call-to-action system provides instantaneous feedback to a viewer on a successful interaction with a call-to-action element, while at the same time not interrupting the viewer's enjoyment of the live video stream presentation.

Thus, the call-to-action system is advantageous for broadcasters and viewers. For broadcasters, the call-to-action system provides an efficient and fun way for a broadcaster to provide benefits to viewers in real-time based on predefined call-to-action settings. Furthermore, the call-to-action system enables broadcasters to easily reengage with viewers. By providing benefits to viewers through the call-to-action system, broadcasters can effectively drive additional traffic and profit to their business when the call to action awards an offer or coupon that entices a viewer to more fully engage with a business. Additionally, by providing the benefit via a social networking system, the broadcaster does not have to store or utilize mailing lists (e.g., for electronic mail or physical mail), nor does the broadcaster have to put in the time and effort to identify potential benefit recipients who match a desired set of demographics.

For the viewers, the call-to-action system provides an effective and engaging way for the viewers to interact with the broadcaster. For example, the broadcaster may configure the call-to-action system to release a particularly desirable offer (e.g., a three-night vacation to Mexico) when at least 500 comments are submitted in relation to the live video stream that state what they like best about a certain product. Thus, the viewers are incentivized to submit comments in relation to the live video stream where they otherwise may not have bothered with a physical comment card or standard email.

Furthermore, by working in connection with a social networking system, the call-to-action system easily and effectively provides viewers with access to benefits they have won. The call-to-action system also automatically provides viewers with reminders and notifications associated with their awarded benefits after the live video stream has ended. This saves the broadcaster the time and effort involved in sending notifications and reminders manually.

The call-to-action system also provides call-to-action elements and awards benefits without interrupting a live video stream. This feature ensures that the broadcaster can further engage with one or more viewers without detracting from the message of his live video stream. This illustrates a significant benefit of the call-to-action system over conventional systems that typically direct the viewer away from the live video stream once the viewer interacts with a displayed element.

Additionally, the call-to-action system provides various computational efficiencies. For example, by working in concert with a social networking system, the call-to-action system streamlines data storage and processing systems in a typical client-computing device. For example, the call-to-action system requires no additional video streaming support (e.g., software such as plugins and/or applications) beyond what is utilized by a social networking system application, as will be described further below. Additionally, because all benefits awarded to a viewer are stored within the social networking system, the call-to-action system requires no additional data storage within the client-computing device.

FIG. 1 illustrates an example block diagram of an environment for implementing the call-to-action system 100. As illustrated in FIG. 1, the call-to-action system 100 includes a broadcasting client device 102 including a social networking system application 104, and viewer client devices 106a, 106b including the social networking system application 108a, 108b respectively. Further shown in FIG. 1, the call-to-action system 100 also includes a server 110 hosting the social networking system 112.

The broadcasting client device 102, the viewer client devices 106a, 106b, and the server 110 communicate via a network 114, which may include one or more networks and may use one or more communication platforms or technologies suitable for transmitting data and/or communication signals. In one or more embodiments, the network 114 includes the Internet or World Wide Web. The network 114, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Additional details relating to the network 114 are explained below with reference to FIG. 7.

Although FIG. 1 illustrates a particular number and arrangement of client devices, in additional embodiments the broadcasting client device 102 and the viewer client devices 106a, 106b may directly communicate with the social networking system 112, bypassing the network 114. Further, in other embodiments, the call-to-action system 100 may include any number of viewer client devices as well as additional client devices authorized to interact with the broadcasting client device 102, the detail of which will be provided further below.

In one or more embodiments the broadcasting client device 102 and the viewer client devices 106a, 106b can be one of various types of computing devices. For example, each of the broadcasting client device 102 and the view client devices 106a, 106b may include a mobile device such as a mobile telephone, a smartphone, a PDA, a tablet, or a laptop. Additionally, or alternatively, the broadcasting client device 102 and the viewer client devices 106a, 106b may include a non-mobile device such as a desktop computer, a server, or another type of computing device. It will be understood that a broadcasting client device and a viewer client device can include the same type of computing functionality. In other words, in a preferred embodiment, both the broadcasting client device and the one or more viewer client devices are mobile computing devices such as smartphones. Additional details with respect to the broadcasting client device 102 and the viewer client devices 106*a*, 106*b* are discussed below with respect to FIG. 6.

As will be described in more detail below, the components of the call-to-action system 100 can provide, along and/or in combination with the other components, one or more graphical user interfaces ("GUIs"). In particular, the social networking system applications 104, 108*a*, and 108*b* can display one or more GUIs generated by the social networking system 112. The social networking system applications 104, 108*a*, and 108*b* can allow a user to interact with a collection of display elements provided within one or more GUIs for a variety of purposes. FIGS. 2A-2B and 3A-3G and the description that follows illustrate various example embodiments of the GUIs that are used to describe the various features of the call-to-action system 100.

Figure 2A:
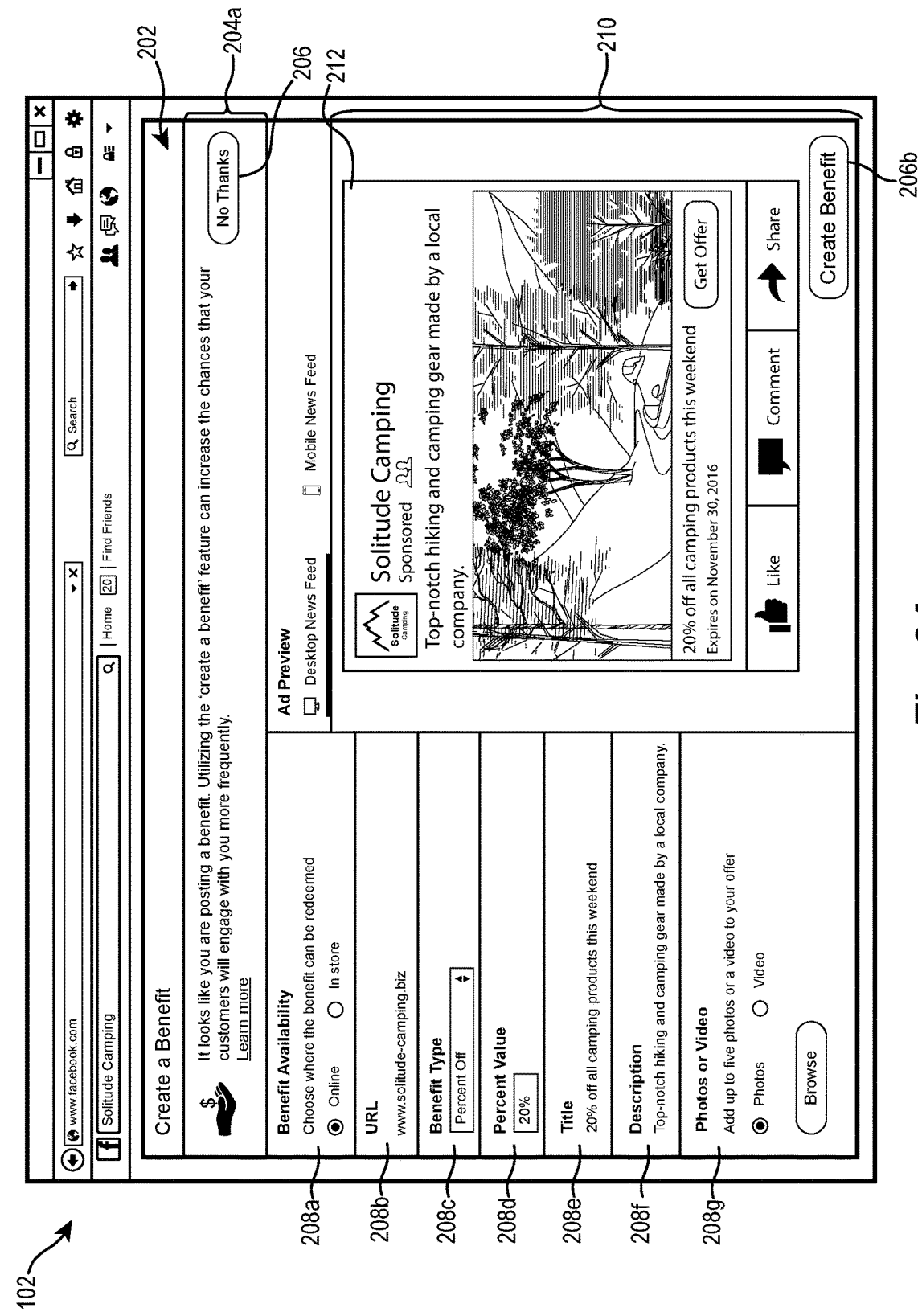
FIGS. 2A-2B illustrate a series of graphical user interfaces of the call-to-action system for defining one or more characteristics of a call to action in accordance with one or more embodiments.

As mentioned above, a broadcaster (or a sponsor of a broadcaster) can configure a call to action to provide in connection with a live video stream associated with the broadcaster. As used herein, the term "broadcaster" means a user of the social networking system that provides a live video presentation. The broadcaster can be a person, merchant, business, or other organization. As used herein, the term "sponsor" means a user of the social networking system that provides a call to action on a broadcasting user's live video stream. In at least one embodiment, the call-to-action system 100 provides a benefit setup GUI 202 (or simply GUI 202) to the broadcasting client device 102 associated with the broadcaster, as shown in FIG. 2A. In addition, the call-to-action system 100 can provide the GUI 202 to a client device associated with a sponsor. In particular, the broadcaster (or sponsor) can interact with the GUI 202 to create and define a call to action that the call-to-action system can deploy along with a presentation of a live video stream.

For example, and as illustrated in FIG. 2A, GUI 202 provides various controls, settings, and definitions that allow a broadcaster (or a sponsor) to setup a call to action that includes a benefit. Specifically, GUI 202 can include a benefit explanation 204, various benefit configuration controls 208*a*-208*g*, and a benefit preview 210. For example, the benefit explanation 204 includes text explaining the purpose of a benefit and the uses of storing a benefit within the social networking system 112. The benefit explanation 204 can include text that invites a broadcaster to create a benefit to associate with a call to action that the call-to-action system 100 can provide during a live video presentation. If the broadcaster does not wish to create a benefit, the user can simply click the no thanks button 206*a*. For example, in one or more embodiments, a broadcaster can create a call to action that is not associated with any particular benefit.

The call-to-action system 100 also provides various benefit controls 208*a*-208*g* as part of the GUI 202 in the event the broadcaster decides to create a benefit to associate with a call to action. For example, each of the controls 208*a*-208*g* provide various text boxes, radio buttons, drop-down lists, and so forth where the broadcaster may enter information to create a structured benefit object that the social networking system 112 stores. To illustrate, the user can specify where the benefit may be redeemed (e.g., online, in a store) via the benefit control 208*a*. The user can also specify a uniform resource locator associated with the benefit via the benefit control 208*b*, for instance a website where a user can redeem the benefit. Next, the user can specify a benefit type (e.g., percent off, dollars off, buy X get Y, etc.) via the benefit control 208*c*. The user can further specify details associated with the benefit type via the benefit control 208*d*, for example, if the benefit type is "percent off," the call-to-action system 100 can update the benefit control 208*d* with a dropdown box for the user to specify a percent value. The user can also specify a title and description of the benefit via the benefit controls 208*e* and 208*f*. Finally, the user can upload or add media associated with the benefit via the benefit configuration control 208*g*.

In one or more embodiments, the call-to-action system 100 may automatically extract benefit information in order to auto-populate the benefit configuration controls 208*a*-208*g*. For example, the call-to-action system 100 can automatically recognize and extract information related to a benefit from a user's electronic communications (e.g., electronic posts or messages) sent via the social networking system 112. In that case, the call-to-action system 100 can provide the create a benefit GUI 202 with auto-populated information in response to the user including the information in a social networking system electronic communication.

The call-to-action system 100 creates a preview of the structured benefit object using information provided via the benefit controls 208*a*-208*g*. For example, as shown in FIG. 2A, the call-to-action system 100 shows a structured benefit object preview 212, including all information specified via the benefit controls 208*a*-208*g*. As shown, the structured benefit object preview 212 includes the title and description specified via the benefit controls 208*e* and 208*f*. The user can finalize the structured benefit object by clicking the create benefit button 206*b*, as shown in FIG. 2A.

In response to the user clicking the create benefit button 206*b*, the call-to-action system 100 creates and stores the structured benefit object within the social graph. For example, the call-to-action system 100 stores the created structured benefit object such that it is associated with a social networking system account of a broadcaster. In this way, the broadcaster can review and utilize created benefits by, for example, associating a previously created structured benefit object with a call to action, as will be described in greater detail below.

Nevertheless, and to provide a general understanding of the function of a structured benefit object, the social networking system 112 can provide a reference to the structured benefit object within newsfeeds, posts, listings, notifications, and so forth, and as a result, the social networking system can provide a representation of the structured benefit object as shown by the structured benefit object preview 212. In response to a social networking system user interacting with the structured benefit object preview 212 (e.g., from within the user's news feed or notifications), the call-to-action system 100 provides the user access to the defined benefit. For example, the call-to-action system 100 provides the user access to the defined benefit as laid out according the settings entered by the user via the GUI 202, as shown in FIG. 2A. To illustrate, according to the settings illustrated in FIG. 2A, the call-to-action system 100 will provide an offer for "20% off all camping products this weekend" to a social networking system user who successfully interacts with the structured benefit object associated with that benefit via a post, a notification, a call to action, etc.

Figure 2B:
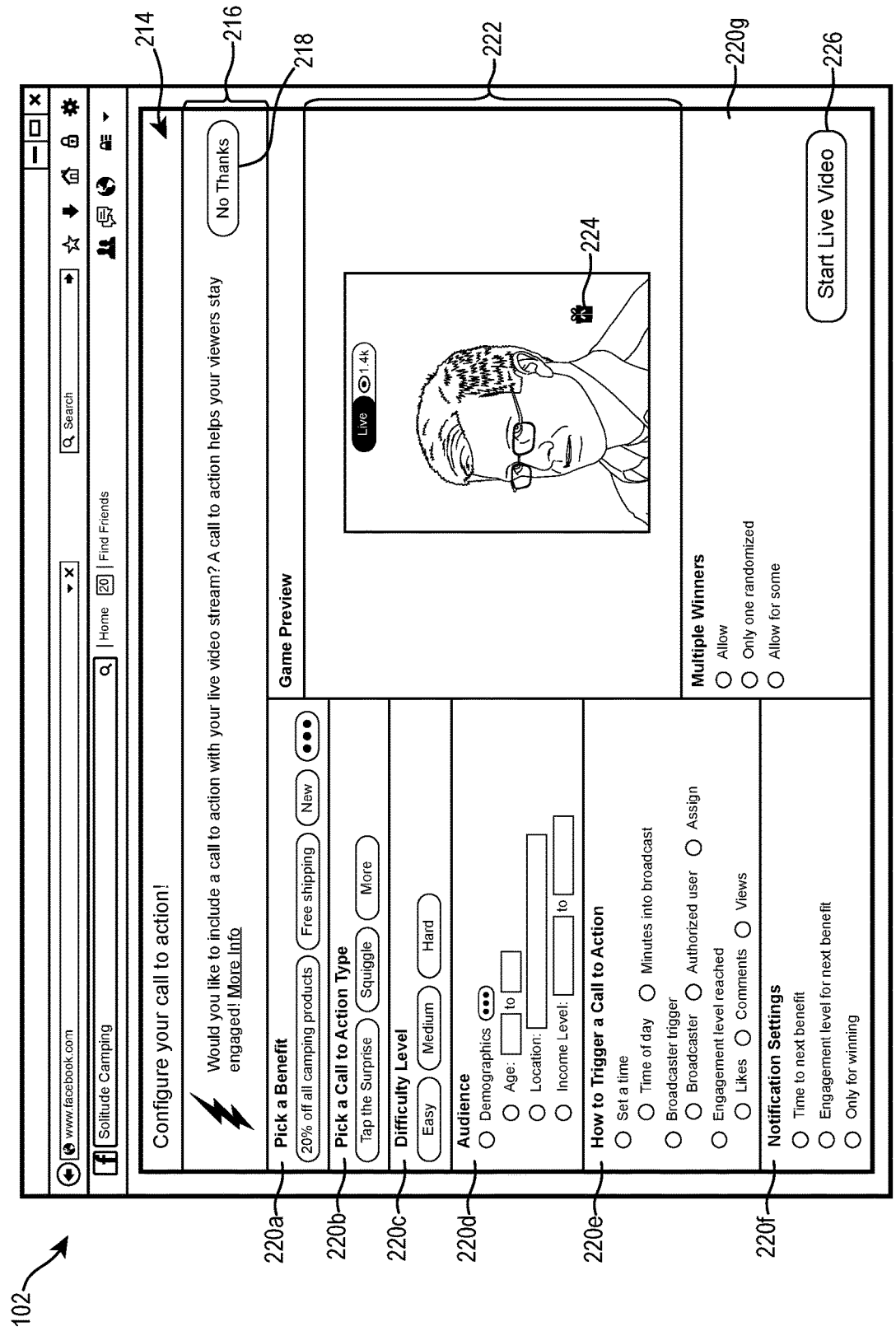

In addition to defining a benefit, the call-to-action system 100 can also allow the broadcaster to define a call to action to deploy during a live video stream. In one or more embodiments, the call-to-action system 100 allows a broadcaster to define a call to action prior to the initiation of a live video stream. For example, as shown in FIG. 2B, the call-to-action system 100 provides the call to action setup GUI 214 (or simply GUI 214) to the user of the broadcasting client device 102 (e.g., the broadcaster). For example, the call-to-action system 100 can provide GUI 214 in response to receiving an indication from the broadcasting client device 102 of the broadcaster selecting an option to start a live video stream. Alternatively, the call-to-action system 100 may provide GUI 214 to the broadcasting client device 102 in response to receiving an indication that the broadcaster selected an option to configure a call to action for use at some point in the future.

As shown in FIG. 2B, GUI 214 includes various controls with which the broadcaster can interact to setup or otherwise define call-to-action characteristics and/or trigger settings by which the call-to-action system 100 will provide a call to action to one or more viewers of a live video stream. As used herein, a "call-to-action characteristic" (or "characteristic") refers to a defined or set attribute of the call to action. For example, call-to-action characteristics include, but are not limited to, the call to action type (e.g., an interactive series of graphics overlaid on the live video stream, a textual message overlaid on the live video stream, etc.), a benefit associated with the call to action (e.g., an offer, a coupon, a credit, etc.), a call-to-action element (e.g., a graphic representing a call to action), a difficulty level associated with the call to action (e.g., settings associated with how a viewer interacts with a call-to-action element), benefit qualifications rules that define how a viewer qualifies to receive a benefit, desired audience demographics associated with the call to action, notifications associated with the call to action, as well as various other attributes that will be discussed in further detail below.

As mentioned, in addition to allowing a broadcaster to define various characteristics of a call to action, GUI 214 can also enable a broadcaster to define one or more trigger settings. Also as used herein, "trigger settings" refer to one or more defined settings that dictate how and when the call-to-action system 100 triggers a call to action during a live video stream. For example, trigger settings can include, but are not limited to, a predefined time trigger, a user interaction trigger, and a predefined engagement level trigger.

Call-to-action characteristics and trigger settings are further described with reference to FIG. 2B. As shown in FIG. 2B, the call to action configuration GUI 214 includes an explanation box 216 that introduces calls to action and provides a link to more information about calls to action. If the broadcaster would not like to create a call to action, the broadcaster may simply click the no thanks button 218. Likewise, when the broadcaster desires to create a call to action, the broadcaster can interact with controls 220a through 220f to define various characteristics and trigger settings.

For example, as part of defining a call to action, the broadcaster can choose to associate a benefit with a call to action using control 220a. As shown in FIG. 2B, the call to action configuration control 220a includes multiple selectable graphic elements (e.g., buttons) listing different benefits that the broadcaster can associate with a call to action. In one or more embodiments, one or more of the buttons are associated with a previously configured structured benefit object. For example, as described above, the broadcaster may have previously configured a structured benefit object entitled "20% off all camping products this weekend," via GUI 202, shown in FIG. 2A. Accordingly, in response to the broadcaster previously creating that structured benefit object, the call-to-action system 100 determines that the structured benefit object is associated with the broadcasters social networking account, and in response provides the benefit corresponding to the structured benefit object as a selectable option within the control 220a.

In addition to a selection of a particular previously created benefit, the call-to-action system 100 can provide various other benefit options in association with the control 220a. For example, the call-to-action system 100 can provide additional previously configured structured benefit objects. If the broadcaster has previously configured multiple structured benefit objects, the call-to-action system 100 can provide a full listing of previously configured structured benefit objects in response to the broadcaster selecting the ellipses button within the call to action configuration control 220a.

Moreover, the call-to-action system 100 can provide generic structured benefit objects (e.g., "Free Shipping") in association with the control 220a. The generic structured benefit objects can be predefined benefits that a system administrator creates and stores within the social networking system. Accordingly, when a broadcaster chooses to create a call to action, the call-to-action system 100 can provide a generic structured benefit based on a determination that the generic benefit likely applies to the particular broadcaster. For example, the call-to-action system 100 can determine that a broadcaster is an online merchant, and thus, provide the "Free Shipping" generic structured benefit. In one or more embodiments, the call-to-action system 100 further allows a broadcaster to customize a generic structured benefit upon selection of the generic structured benefit.

In addition to providing previously defined benefit options, the call-to-action system 100 can provide an option within the control 220a to enable the broadcaster to configure a new structured benefit object. For example, in response to the broadcaster selecting the "New" button, the call-to-action system 100 can transition the broadcaster to GUI 202, shown in FIG. 2A. Utilizing GUI 202, the broadcaster can configure a new structured benefit object, as described above. In at least one embodiment, the call-to-action system 100 can then add the newly configured structured benefit object to the call to action configuration control 220a.

In addition to defining a benefit for a call to action, the broadcaster can further define the characteristics of the call to action via the control 220b (i.e., "Pick a Call to Action Type"). As illustrated in FIG. 2B, the control 220b includes different types of calls to action. For example, the "Tap the Surprise" call to action provides a call-to-action element that is a birthday present graphic that appears to float over the live video stream presentation, and where, in response to the call-to-action system 100 detecting that a viewer successfully tapped the birthday present, the call-to-action system 100 provides the benefit associated with the call to action to the viewer.

Another type of call to action illustrated in FIG. 2B is "Squiggle." In one or more embodiments, the Squiggle call to action asks viewers via a ticker tape display along the bottom of the live video stream to perform various types of touch gestures (e.g., "draw an X over the live video stream," "draw a sideways V over the live video stream," etc.). For example, the instructions may increase in speed such that only viewers with quick and accurate dexterity can successfully perform the touch gestures over a longer period of time. The call-to-action system 100 can provide a full listing of call to action types in response to the broadcaster selecting the more button within the control 220b. As one will appreciate, call to action types can vary from one embodiment to the next, but generally, a call to action type provides one or more interactive elements with which a viewing user can interact.

The broadcaster can also specify a difficulty level associated with the call to action via the control 220c. For example, depending on the type of call to action a broadcaster selects via the control 220b, the call-to-action system 100 can provide the call to action at varying levels of difficulty. To illustrate, if the call to action type is "Tap the Surprise," an easy difficulty level includes a birthday present (e.g., a call-to-action element) that floats slowly in a predictable pattern from one side of the display to the other. A medium difficulty level increases the speed and movement pattern of the floating birthday present. A hard difficulty level further increases the speed of the floating birthday present and causes the pattern of movement to become unpredictable. The difficulty level set using control 220c can also affect the size of a selectable area of a call-to-action element (e.g., the size of a selectable area decreases as the difficulty level increases).

Another call-to-action characteristic that the broadcaster can define within GUI 214 is a demographic of an audience to whom the broadcaster would like the call to action to be available. For instance, and as illustrated in FIG. 2B, GUI 214 can include control 220d to allow a broadcaster to define various characteristics of a desired audience for the call to action. For example, the broadcaster may only want to provide a particular call to action (and associated benefit) to viewers that meet one or more demographic specifications. To illustrate, the broadcaster may want to include a call to action as part of a live video stream as a way to provide a coupon for 20% off all inventory of women's clothing. Accordingly, the broadcaster may only be interested in providing the call to action to viewers who are female and at least 18 years old. In another example, the broadcaster may desire to provide a call to action to viewers living within a defined geographic region. Thus, based on the settings a broadcaster defines with respect to control 220d, the call-to-action system 100 identifies viewer demographic information from the viewer's social networking system profile, social networking system activity history, and social networking system account settings, as will be described in greater detail below.

In one or more embodiments, the GUI 214 can enable the broadcaster to define a complex call to action associated with multiple benefits, types, difficulty levels, and demographic groups. For example, during the live video stream, the broadcaster may want to release 30 low-value benefits (e.g., "free shipping!"), 5 mid-value benefits (e.g., "$25 off your entire order!"), and one high-value benefit (e.g., a grand prize such as a "Free Fall Wardrobe!"). Accordingly, GUI 214 may be used to associate particular benefits, with particular demographic specifications, types of call to action, difficulty levels, and so forth.

To further illustrate, in at least one embodiment, the broadcaster can configure multiple audience demographic groups for a particular call to action, where each demographic group is eligible for a different benefit. For example, the broadcaster may configure a first demographic group for viewers who are between the ages of 18 and 25, and select an offer for a free t-shirt as a benefit for call to action winners within that group. The broadcaster may then configure a second demographic group for viewers who are between the ages of 26 and 40, and select an offer for 25% off business attire as a benefit for call to action winners within the second group. Thus, the call-to-action system 100 will provide the call to action to all viewers who are between the ages of 18 and 40, but the call-to-action system 100 will provide a different benefit depending on a particular viewers age. In one or more embodiments, the call-to-action system 100 can provide more complex audience demographic settings in response to the broadcaster selecting the ellipses button within the call to action configuration control 220d.

As mentioned above, the broadcaster can also configure trigger settings associated with the call to action via the call to action configuration GUI 214. For example, as shown in FIG. 2B, the broadcaster can configure one or more trigger settings via the control 220e. In one or more embodiments, the trigger settings allow for the broadcaster to select one or more of a time trigger, a user interaction trigger, and an engagement level trigger.

To illustrate, in response to the broadcaster selecting the time trigger (e.g., the "set a time" radio button), the call-to-action system 100 can provide additional options related to the time trigger. For example, as shown in FIG. 2B, the call-to-action system 100 can provide radio buttons for the broadcaster to select "Time of Day," and/or "Minutes into Broadcast." In one or more embodiments, the time of day option enables the broadcaster to select a specific time of day when the call-to-action system 100 should provide the configured call to action to the viewers of the live video stream. For instance, if the broadcaster specifies that the call-to-action system 100 should provide the call to action at noon, the call-to-action system 100 will provide the call to action at that time during a live video stream. Alternatively, based on a selection of the "Minutes into Broadcast," the call-to-action system 100 can deploy the call to action after a specified duration of time elapses from the initiation of the live video stream. Additionally, if the broadcaster has defined more than one call to action in combination with a single live data stream, the call-to-action system 100 can provide various settings that enable the broadcaster to specify a time trigger that is an amount of time from a triggering of a previous call-to-action element.

In one or more embodiments, and in response to the broadcaster selecting the user interaction trigger, (e.g., the "Broadcaster Trigger" radio button), the call-to-action system 100 can provide additional options related to the user interaction trigger. For example, the call-to-action system 100 can provide a call to action in connection with a live video stream in response to a specific command given by the broadcaster, or by someone to whom the broadcaster grants rights associated with the call to action (e.g., a sponsor). Thus, in response to the broadcaster selecting the "Broadcaster" option under the user interaction trigger, the call-to-action system 100 can provide the broadcaster with a control (e.g., a button) that is displayed adjacent to the live video stream window while the broadcaster is filming the live video stream. Additionally, in one or more embodiments, the broadcaster can configure additional security for the control (e.g., a passcode, a fingerprint scan). In response to the broadcaster interacting with the control, the call-to-action system 100 can provide the call to action in connection with the live video stream.

In one or more embodiments, the broadcaster can enable another social networking system user to trigger the call to action. For example, the broadcaster may be working in connection with a sponsor or a manager. In that case, the broadcaster can grant access to that third party to trigger the call to action. The broadcaster may maintain, as part of his social networking system account, a list of pre-approved third parties, or may specify the third party via the call to action configuration control 220e. In at least one embodiment, the third party may be a live video stream viewer.

In one or more embodiments, the broadcaster and the third party or sponsor have a defined "sponsor" or trust relationship within the social networking system 112 that allows the third party to provide a call to action with respect to the broadcasters live video streams. For example, in some embodiments, but broadcaster and sponsor create a custom relationship via the social networking system 112 that defines how and under what circumstances the sponsor can provide a call to action in connection with the broadcaster's live video stream. In one or more embodiments, the sponsor or broadcaster can reach out utilizing one or more functions of the social networking system 112 (e.g., a friend request, an electronic message, etc.) to create the custom sponsor-broadcaster relationship. Once the sponsor or broadcaster accepts the offer to create the custom relationship, the sponsor and/or broadcaster can further define the terms of the custom relationship.

To illustrate, the custom relationship may define that the sponsor can trigger one or more calls to action in connection with the broadcaster's live video stream on a particular date. Additionally, the custom relationship may define that the sponsor can only trigger a call to action in connection with the broadcaster's live video stream once the sponsor has paid the broadcaster a certain amount. In that case, the social networking system 112 can utilize various payment utilities to request to payment from the sponsor prior to enabling the sponsor to trigger the call to action.

In addition to the broadcaster trigger, a broadcaster can also use control 220e to set an engagement level trigger (e.g., the "Engagement Level Reached" radio button shown in FIG. 2B). For example, the call-to-action system 100 can provide various engagement level options related to the engagement level trigger, such as options that allow a broadcaster to define a number of "likes," a number of "comments," and/or a number of viewers.

As described above, viewers of the live video stream can engage with the broadcaster and the live video stream in various ways. For example, a viewer can "tune-in" to the live video stream (e.g., can scroll to the live video stream displayed in the viewer's newsfeed within the social networking system 112, can click on a post related to the live video stream causing the live video stream to load within its own display, etc.), can "like" the live video stream, can submit comments via the social networking system 112 related to the live video stream, and so forth. In one or more embodiments, the broadcaster may only want the call-to-action system 100 to trigger the call to action once the viewing audience reaches a particular engagement level. Accordingly, the broadcaster can specify, via the control 220e one or more engagement levels that must be reached before the call-to-action system 100 can trigger the call to action.

To illustrate, if the broadcaster selects "Likes" as an engagement level trigger, the call-to-action system 100 can provide an input box wherein the broadcaster can provide a specific number of likes. For instance, if the broadcaster inputs "500 likes," the call-to-action system 100 will trigger the call to action once at least 500 social networking system users viewing the live video stream have clicked the social networking system button indicating that they liked the lived video stream. In one or more embodiments, the broadcaster can further specify if the likes must be in direct association with the live video stream (e.g., must be submitted by viewers while the live video stream is on-going), or if the likes can be tangentially related to the live video stream (e.g., the call-to-action system 100 can count likes of an earlier post from the broadcaster announcing the time and date of the live video stream).

Along similar lines, if the broadcaster selects "comments" as an engagement level trigger and inputs "15 comments," the call-to-action system 100 will trigger the call to action once live video stream viewers submit at least 15 comments related to the live video stream. In one or more embodiments, the broadcaster can further specify that the call-to-action system 100 can only take into account comments with an appropriate sentiment. For example, the broadcaster can specify that the call-to-action system 10 should use natural language processing to determine whether the contents of a comment are positive or negative. The broadcaster can further specify that the call-to-action system 100 should only trigger the call to action in response to a given number of positive comments.

Moreover, if the broadcaster selects "views" as an engagement level trigger and inputs "1000 views," the call-to-action system 100 will trigger the call to action once at least 1000 viewers are simultaneously viewing the live video stream. The viewership of the live video stream may ebb and flow over the course of the live video stream. Accordingly, the broadcaster can further specify that the call-to-action system 100 should trigger the call to action only the first time the viewership achieves the predetermined number, each time the viewership achieves the predetermined number, or after viewership has maintained the predetermined number for a certain amount of time.

The broadcaster can specify multiple triggers associated with the same call to action. For example, as described above, the broadcaster may have defined multiple demographic groups within the call to action, where each demographic group is associated with a different benefit. Accordingly, the broadcaster can configure one or more triggers for each benefit. For example, the broadcaster can specify guaranteed type triggers (e.g., time of day or minutes into a broadcast) associated with a benefit of low value, and unguaranteed type triggers (e.g., number of comments) associated with a benefit of greater value. The broadcaster can access more advanced trigger settings by clicking the ellipses button within the call to action configuration control 220e.

Furthermore, if the broadcaster defines multiple calls to action in association with the same live video stream, the call-to-action system 100 can provide settings associated with the frequency with which a call to action may be triggered. For example, the broadcaster can define that a call to action may be trigger no more often than every five minutes (regardless of the trigger). In that case, for example, if two calls to action are triggered within a five minute interval, the call-to-action system 100 will release the first call to action when it is triggered, then wait for five minutes prior to releasing the second call to action, even though the second call to action has already been triggered.

As mentioned above, in response to a viewer interacting with a call to action (e.g., providing a touch gesture with respect to a call-to-action element), the call-to-action system 100 can provide a notification to the viewer. Accordingly, the broadcaster can configure various aspects of the notifications provided by the call-to-action system 100 via the control 220f. For example, the notification may inform the viewer that the viewer did not receive the benefit corresponding to the call to action (e.g., he did not tap on the floating birthday present quickly enough) or may inform the viewer that the viewer did receive the benefit associated with the call to action (e.g., "You Won!"). Additionally, the call-to-action system 100 can provide extra information to viewers via notifications including how long it will be before another call to action is triggered (e.g., "Don't leave yet! Another prize will be offered within the next 5 minutes!"), an engagement level that must be reached before another call to action is triggered (e.g., "Just 5 more comments and a prize will be released!), and so forth.

Using the control 220f the broadcaster can configure various aspects of the notifications provided by the call-to-action system 100 via. For example, the broadcaster can specify that the call-to-action system 100 should only provide a notification to a viewer who correctly interacts with a call to action (e.g., only for a viewer who correctly taps on the floating birthday present). In that case, viewers who fail to "win" the call to action receive no notification from the call-to-action system 100.

Alternatively, the broadcaster can specify that the call-to-action system 100 should provide encouraging notifications to viewers who "lose" the call to action (e.g., viewers who try to tap on the floating birthday present but are not accurate enough). In that case, the broadcaster can specify that each time a viewer attempts to interact with a call to action, but fails to win a benefit, the call-to-action system 100 should provide a notification to that viewer including information that will keep the viewer engaged. For example, the broadcaster can specify that the call-to-action system 100 should include a message encouraging the viewer to keep watching the live video stream because the next call to action will be triggered at a given time (e.g., "Stay right there, the next present will come floating by in just 3 minutes!"), or at a given engagement level (e.g., "Sorry you didn't catch that last one, the next present will be released after another 50 viewers tune in!").

In addition to providing notification settings, GUI 214 can further provide control 220g that allow a broadcaster to define various settings to determine which viewers to provide a benefit based on viewer interactions with a call-to-action element. For example, the call-to-action system 100 can provide a call-to-action element, and in response, multiple viewers may simultaneously qualify for a limited benefit. To illustrate, in at least one embodiment, a viewer client device detects when a viewer has interacted with a call-to-action element (e.g., via a touch gesture or other input), determines whether the detected interaction qualifies as a successful interaction with the call-to-action element (e.g., if the viewer interacted with an area of the display associated with the call-to-action element), and reports a time stamp associated with the detected interaction and a success or failure status of the interaction to the call-to-action system 100. Accordingly, the call-to-action system 100 may receive multiple interaction reports from multiple viewers that indicate the multiple viewers simultaneously qualified for the benefit. However, and as mentioned above, the number of available benefits may be less than the number of the multiple qualified viewers. The call-to-action system 100 can handle such a situation in a variety of ways.

For example, the broadcaster can specify via the control 220g how the call-to-action system 100 handles a tie for a call to action associated with the live video stream. First, the broadcaster can specify whether the call-to-action system 100 will allow multiple winners. In at least one embodiment, the call-to-action system 100 determines that there are multiple winners by comparing timestamps from all the viewer client device reports where the viewer has correctly interacted with the call to action. In that case, the call-to-action system 100 identifies the one or more viewers associated with the earliest timestamp. If the earliest timestamp is associated with multiple viewers, the call-to-action system 100 determines that there are multiple winners for the call to action based on the setting indicating that there can be multiple winners.

Alternatively, the broadcaster can specify that the call-to-action system 100 should only award the benefit associated with the call to action to one viewer from the group of multiple winners (e.g., the "Only one randomized" radio button). In that case, the broadcaster can specify that the call-to-action system 100 should randomly select a single winner or a predefined number of winners from the group of multiple viewers who correctly interacted with the call-to-action element at exactly the same time. For example, the call-to-action system 100 can assign each of the multiple viewers a particular number ID, and use a random number generator to generate a predefined set of numbers that are used to select a corresponding predefined number of viewers based on the assigned number ID associated with each of the multiple viewers.

Additionally, if more than one call to action has been configured in connection with a live video stream, the broadcaster can specify that the call-to-action system 100 should allow multiple winners for only some calls to action (e.g., the "Allow for some" radio button). In that case the call-to-action system 100 can allow for multiple winners for certain benefits (e.g., for low-value benefits like "free shipping"), but not from other benefits (e.g., for a high-value benefit like "3 Night Vacation"). In at least one embodiment, clicking on the "Allow for some" radio button opens another GUI with additional controls for defining winners of a call to action.

Notwithstanding the various setting controls that GUI 214 provides, FIG. 2B further illustrates that the call-to-action system 100 can provide a live video stream preview 222 including a call-to-action element preview 224 via GUI 214. In one or more embodiments, the live video stream preview 222 including the call-to-action element preview 224 demonstrates how the configured call to action will appear to viewers of a live video stream. For example, in response to the broadcaster configuring a call to action that is a "Tap the Surprise" interaction, the call-to-action system 100 generates the call-to-action element preview 224 and overlays the call-to-action element preview 224 on the live video stream preview 222. The call-to-action system 100 can demonstrate the appearance, operation, and difficulty level of the configured call to action via the live video stream preview and the call-to-action element preview 224. In at least one embodiment, the broadcaster can configure various appearance options related to the call to action (e.g., the image associated with the call-to-action element, an animation associated with the call-to-action element, the color of the call-to-action element, etc.) by selecting the call-to-action element preview 224.

Once the broadcaster has finished configuring the call to action via the call to action configuration GUI 214, as shown in FIG. 2B, the broadcaster can begin a live video stream by selecting the start live video button 226. In additional or alternative embodiments, the call-to-action system 100 can provide the broadcaster with an option to save the call to action configuration for later use. In that case, the broadcaster can title the call to action and the call-to-action system 100 can save the call to action configurations within the social networking system 112 in a manner that is associated with the social networking system account of the broadcaster.

Figure 3D:
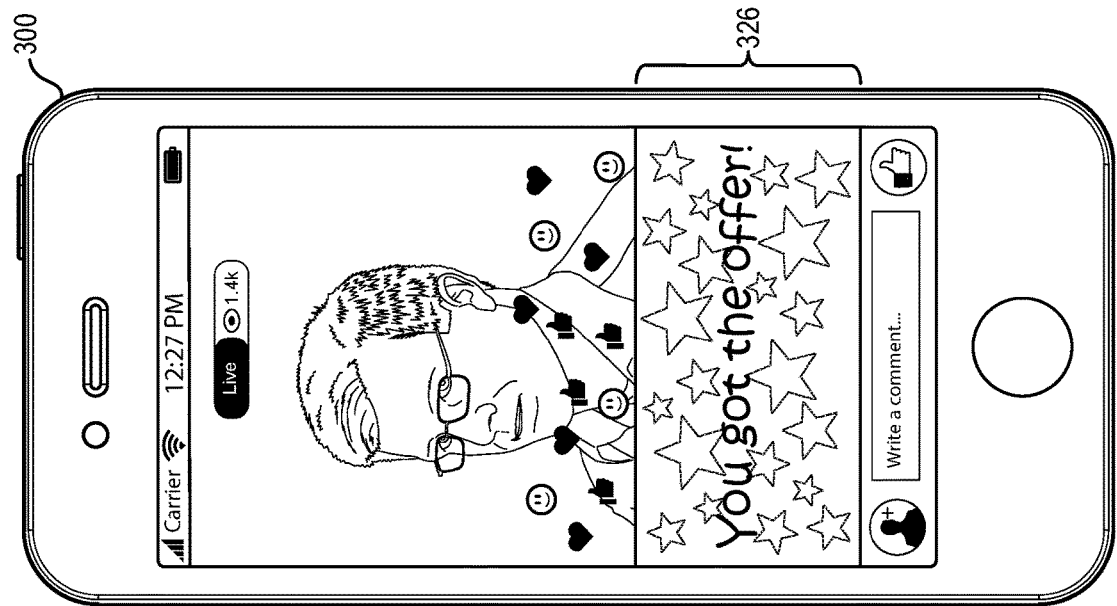

In response to the broadcaster selecting the start live video button 226, the social networking system 112 in connection with the call-to-action system 100 initiates a live video stream and can provide a call to action based on the settings and definitions associated with a call to action. FIGS. 3A-3G illustrate a call to action from the perspective of a viewer client device (e.g., one of viewer client devices 106a, 106b). For example, as shown in FIG. 3A, the viewer client device 300 includes a touch screen display 302. In response to the viewer selecting a link, post, or other associated with the live video stream, the social networking system 112 presents the live video stream GUI 304 via the touch screen display 302 of the viewer client device 300.

In one or more embodiments, the live video stream GUI 304 includes the live video stream display 306. For example, the live video stream display 306 includes a view of the live video stream captured by a client-computing device associated with the broadcaster (e.g., the broadcasting client device 102). In at least one embodiment, the call-to-action system 100 also provides a reaction stream 308 overlaid on the live video stream display 306. For example, the reaction stream 308 causes reaction elements (e.g., hearts, thumbs up, emoticons, etc.) to appear to float across (e.g., from right to left) the live video stream display 306 to indicate the types of reactions viewers are having to the live video stream.

In at least one embodiment, the call-to-action system 100 provides the call-to-action element 310 in association with the reaction stream 308. As used herein, a call-to-action element refers to a display element that is the representation of the call to action configured by the broadcaster. In one or more embodiments, the call-to-action element is often an interactive graphic or image (e.g., a GIF, JPEG, etc.) with which a viewer can interact. For example, the call to action type shown in FIG. 3A is a "Tap the Surprise" interaction, where the call-to-action element 310 represents the "Surprise" on which viewers can tap. In this embodiment, the call-to-action system 100 provides the call-to-action element 310 in combination with the reaction stream 308 to make the "Tap the Surprise" interaction more challenging and engaging. In other embodiments, the call-to-action system 100 may present the call-to-action element without the reaction stream 308, above the reaction stream 308, or on other areas of the GUI 304.

As further shown in FIG. 3A, the live video stream GUI 304 also includes a viewer indicator 312. As mentioned above, the call-to-action system 100 may trigger a call to action in response to a predetermined number of viewers "tuning in" or joining the live video stream presentation. Accordingly, in at least one embodiment, the social networking system 112 can include the viewer indicator 312 to display a number of viewers who are currently watching the live video stream, thus further engaging viewers as viewers can monitor when the number of viewers is approaching a known number of viewers at which the call-to-action system 100 will deploy a call to action (e.g., an engagement trigger).

Additionally, the live video stream GUI 304 includes an engagement display 314. For example, in one or more embodiments, the engagement display 314 includes one or more viewer comments 316a-316c, as well as viewer like indicators 318a-318c. As mentioned above, in at least one embodiment, the call-to-action system 100 can trigger a call to action in response to a predetermined number of viewer comments and/or likes being submitted to the social networking system 112 in association with the live video stream. Accordingly, the social networking system 112 can include these elements in the live video stream GUI 304 such that a viewer can have a better sense of how other viewers are engaging with the live video stream.

Furthermore, and as illustrated in FIG. 3A, the live video stream GUI 304 includes a comment text box 320 and a like control 322. Utilizing the comment text box 320 and the like control 322, a viewer associated with the viewer client device 300 can submit comments and likes in association with the live video stream. In at least one embodiment, the viewer submits comments and/or likes in response to a prompt from the broadcaster indicating that a call to action will be triggered by additional comments and/or likes being submitted by the viewers of the live video stream.

As described above, the call-to-action system 100 can detect the satisfaction of a predefined trigger, and in response, the call-to-action system 100 deploys the call-to-action element 310 in connection with live video stream. For example, as shown in FIG. 3A, the call-to-action system 100 causes the call-to-action element 310 to float across the live video stream display 306, where the viewer may attempt to interact (e.g., tap) the call-to-action element 310 with a finger 324. Importantly, while attempting to interact with the call-to-action element, the viewer remains engaged with the live video stream because the viewer can still see and hear the live video stream display 306, even though the viewer is attempting to interact with the call-to-action element 310.

As shown in FIG. 3B, when the viewer fails to correctly interact with the call-to-action element 310 (e.g., the viewer did not tap within a selection area associated with the call-to-action element 310 prior to the call-to-action element 310 floating off the display or the viewer was not the first viewer to select the call-to-action element), the call-to-action system 100 can momentarily replace the engagement display 314 with a notification display 326. In one or more embodiments, depending on the notification settings configured by the broadcaster, the call-to-action system 100 can provide a notification via the notification display 326 that encourages the viewer to continue to engage with the live video stream by referencing a future call to action. For example, the message included in the notification display 326 informs the viewer that another call to action is coming soon (e.g., "You missed! But stay right there, the next gift comes in 3 minutes!"). In additional or alternative embodiments, the call-to-action system 100 may not give any notification to a viewer who fails to successfully interact with the call-to-action element 310.

Figure 3C:
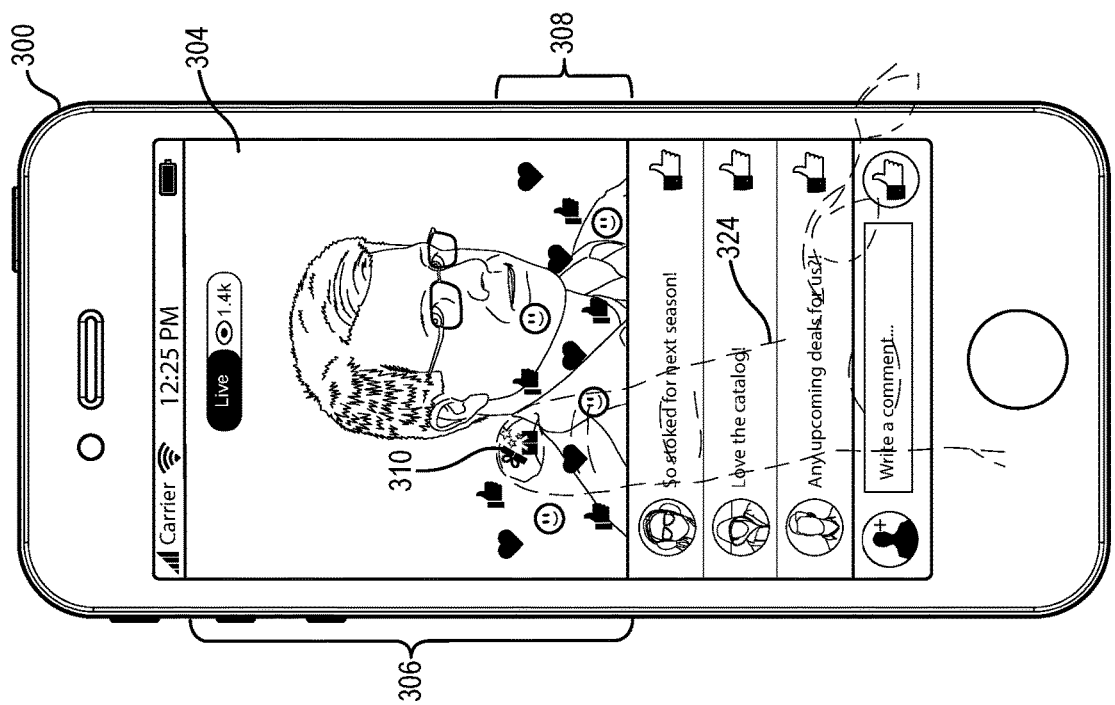

In contrast, in the event a viewer successfully interacts with the call-to-action element 310, the call-to-action system 100 can provide various indicators that the viewer has successfully completed the interaction. For example, as shown in FIG. 3C, in response to the viewer successfully tapping the call-to-action element 310 with his finger 324 (e.g., prior to other viewers), the call-to-action system 100 can change the appearance of or initiate an animation in connection with the call-to-action element 310. For example, as indicated in FIG. 3C, the call-to-action system 100 animates the birthday present to appear as though it is opening and releasing stars. Additionally, or alternatively, the call-to-action system 100 can provide the notification display 326 with a message congratulating the viewer for winning (e.g., "You got the offer!"), as shown in FIG. 3D.

It is noted that even though the viewer has successfully interacted with the call-to-action element 310, the call-to-action system 100 does not obscure or interrupt the live video stream display 306. Thus, the user can continue to enjoy viewing the live video stream while also engaging with various call to actions that the call-to-action system deploys during the presentation of the live video stream. Moreover, after notifying the viewer of the viewer's results with respect to a particular call to action, the live video stream GUI 304 can return to providing the engagement display 314 (shown in FIG. 3A) along with the live video stream display 306 until the viewer closes the live video stream GUI 304 or the live video stream ends.

Based on the viewer closing the live video stream GUI 304, or based on the live video stream ending, the social networking system 112 can provide additional details to the viewer regarding a benefit for which the viewer qualified based on interacting with the call-to-action element 310. For example, in at least one embodiment shown in FIG. 3E, the social networking system 112 provides a notification to the viewer regarding the benefit in a notifications GUI 328. As illustrated in FIG. 3E, the notifications GUI 328 includes a listing of notification elements 330a-330d. In particular, and as indicated in FIG. 3E, the social networking system 112 can provide a notification of the benefit 330a along with other social networking notifications (e.g., notifications 330b-330d showing notifications for comments, likes, and other social networking activity associated with the viewer's social networking account).

In response to the viewer selecting the notification element 330a (e.g., using a tap gesture), the social networking system 112 can provide a saved benefits GUI 332, as shown in FIG. 3F. In one or more embodiments, the saved benefits GUI 332 provides a listing of benefit controls 334a, 334b that have been saved by or awarded to the viewer within the social networking system 112. For example, the benefit element 334a corresponds with the benefit awarded to the user of the viewer client device 300 by the call-to-action system 100 when the call-to-action system determined that the viewer qualified for the benefit based on the viewer interacting with the call-to-action element 310 during the live video stream, as described above.

Figure 3G:
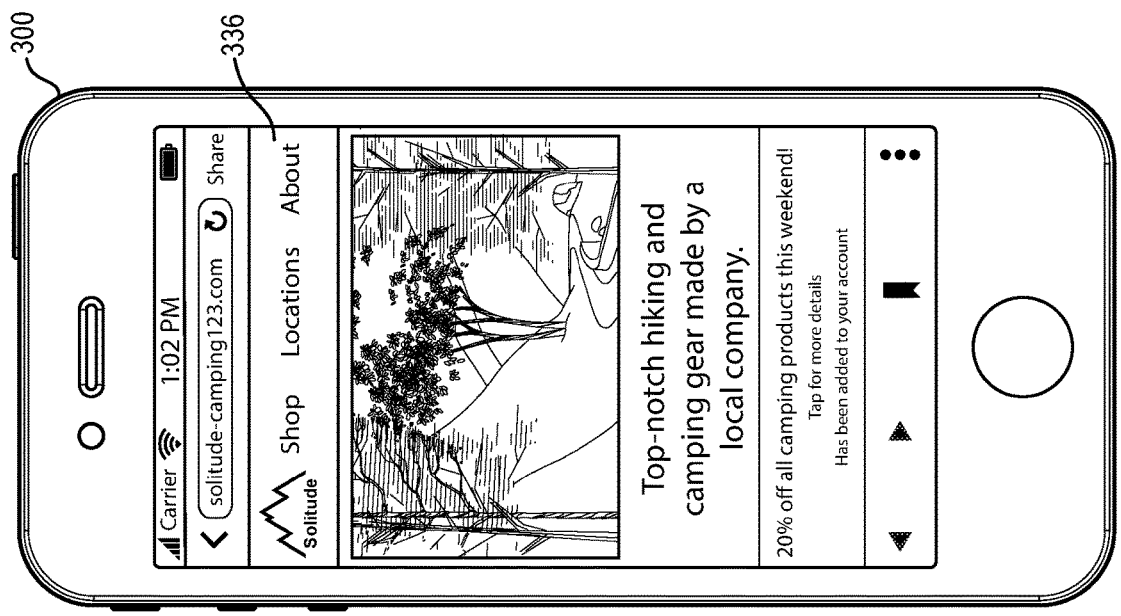

In one or more embodiments, the benefit element 334a includes further explanation and detail regarding the benefit awarded by the call-to-action system 100. In addition, the benefit element 334 can enable the viewer to redeem the benefit. For instance, in response to the viewer selecting the benefit element 334a with his finger 324, as shown in FIG. 3F, the social networking system 112 can interface with a merchant or business defined by the structured benefit object associated with the benefit element 334a. For example, the social networking system 112 can instruct the merchant or business to add the benefit to an account associated with the viewer. Additionally, in response to the viewer selecting the benefit control 334a, the social networking system 112 can transition to a web browser GUI 336, as shown in FIG. 3G. As illustrated in FIG. 3G, the web browser GUI 336 displays the merchant's web page associated with the selected benefit control 334a with an indication that the benefit is available for the viewer to use.

Figure 4:
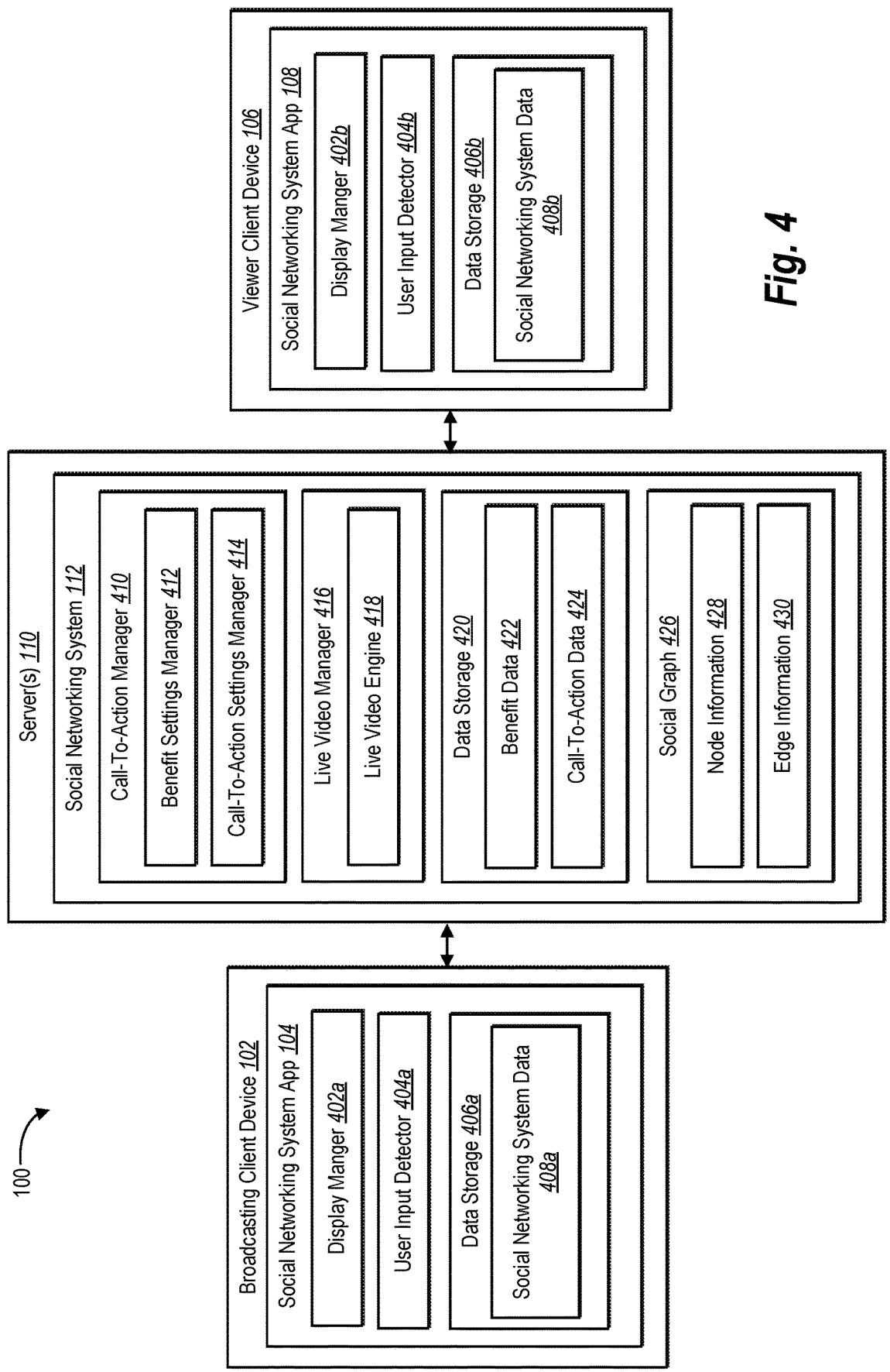
FIG. 4 illustrates a detailed schematic diagram of the call-to-action system in accordance with one or more embodiments.

FIG. 4 illustrates a schematic diagram illustrating an example embodiment of the call-to-action system 100. As shown in FIG. 4, the call-to-action system 100 includes various components for performing the processes and features described herein. For example, as shown in FIG. 4, the call-to-action system 100 includes, but is not limited to, the broadcasting client device 102, the viewer client device 106 (e.g., one of the viewer client devices 106a, 106b illustrated in FIG. 1), and the server 110. In one or more embodiments, the broadcasting client device 102 and the viewer client device 106 each include the social networking system application 104, and 108 respectively, which in turn includes a display manager 402a, 402b, a user input detector 404a, 404b, and a data storage 406a, 406b including social networking system data 408a, 408b. Additionally, the server 110 hosts the social networking system 112, which includes a call-to-action manager 410, a live video manager 416, a data storage 420, and the social graph 426. In one or more embodiments, the call-to-action manager 410 includes a benefit settings manager 412 and a call to action settings manager 414, while the live video manager 416 includes a live video engine 418. Further, the data storage 420 includes benefit data 422 and call to action data 424.

As mentioned above, and in one or more embodiments, the call-to-action manager 410 communicates with the social networking system 112 in order to identify and analyze social networking system user data. Accordingly, in one or more embodiments, the social networking system 112 includes a social graph 426 for representing a plurality of users, actions, and concepts. In one or more embodiments, the social graph 426 includes node information 428 and edge information 430. Node information 428 of the social graph 426 stores information including, for example, nodes for users and nodes for repositories. Edge information 430 of the social graph 426 stores information including relationships between nodes and/or actions occurring within the social networking system 112. Further details regarding the social networking system 112, the social graph 426, edges, and nodes is presented below with respect to FIG. 8.

Each of the components of the social networking system applications 104, 108, and the components of the social networking system 112 can be implemented using a computing device including at least one processor executing instructions that cause the call-to-action system 100 to perform the processes described herein. In some embodiments, the social networking system components described herein can be implemented by the server 110, or across multiple server devices. Additionally, or alternatively, a combination of one or more server devices and one or more client devices can implement the components of the social networking system applications 104, 108. Moreover, the components described herein can comprise a combination of computer-executable instructions and hardware.

In one or more embodiments, the social networking system applications 104, 108 are native applications installed on the broadcasting client device 102 and the viewer client device 106, respectively. For example, either of the social networking system applications 104, 108 can be a mobile application that installs and runs on a mobile device, such as a smart phone or a tablet computer. Alternatively, either of the social networking system applications 104, 108 can be a desktop application, widget, or other form of a native computer program. Furthermore, either of the social networking system applications 104, 108 may be a remote application accessed by the broadcasting client device 102 or the viewer client device 106. For example, either of the social networking system applications 104, 108 may be a web application that is executed within a web browser of the broadcasting client device 102, or the viewer client device 106, respectively.

As mentioned above, and as shown in FIG. 4, the social networking system applications 104 and 108 include a display manager 402a, 402b. The display manager 402a, 402b provides, manages, and/or controls a graphical user interface that allows a social networking system user to interact with features of the social networking system 112 and the call-to-action system 100. For example, the display manager 402a provides a graphical user interface that facilitates the display of the social networking system newsfeed associated with the user of the viewer client device 106. As discussed above, a social networking system user's newsfeed can include social networking posts composed by co-users (e.g., "friends") of the social networking system user, along with articles, advertisements and so forth. In at least one embodiment, the user's newsfeed can include a structured object that when selected causes the social networking system 112 to open the live video stream GUI 304 as shown with reference to FIGS. 3A-3D.

More specifically, the display manager 402a, 402b facilitates the display of a graphical user interface. For example, the display manager 402a, 402b may compose the graphical user interface of a plurality of graphical components, objects, and/or elements that allow a user to engage in social networking system activities. More particularly, the display manager 402a, 402b may direct the broadcasting client device 102 and the viewer client device 106, respectively, to display a group of graphical components, objects, and/or elements that enable a user to interact with various features of the social networking system 112.

In addition, the display manager 402a, 402b directs the broadcasting client device 102 and the viewer client device 106, respectively, to display one or more graphical objects, controls, or elements that facilitate user input for interacting with various features of the social networking system 112. To illustrate, the display manager 402a, 402b provides a graphical user interface that allows a social networking system user to input one or more types of content into a social networking system post or electronic message. As used herein, "content" refers to any data or information to be included as part of a social networking system post or electronic message. For example, the term "content" will be used herein to generally describe text, images, digital media, files, location information, payment information, or any other data that can be included as part of a social networking system post or electronic message.

The display manager 402a, 402b also facilitates the input of text or other data for the purpose of interacting with one or more features of the social networking system 112. For example, the display manager 402a, 402b provides a user interface that includes a touch display keyboard. A user can interact with the touch display keyboard using one or more touch gestures to input text to be included in a social networking system post or electronic message. For example, a user can use the touch display keyboard to compose a message. In addition to text, the graphical user interface including the touch display keyboard can facilitate the input of various other characters, symbols, icons, or other information.

Furthermore, the display manager 402a, 402b is capable of transitioning between two or more graphical user interfaces. For example, in one embodiment, the display manager 402a, 402b provides a newsfeed to a social networking system user containing one or more social networking system posts from co-users. Later, in response to detected input from the social networking system user in connection with a structured object within the newsfeed, the display manager 402a, 402b transitions to a second graphical user interface that includes a display of a live video stream.

As further illustrated in FIG. 4, the social networking system application 104, 108 includes a user input detector 404a, 404b, respectively. In one or more embodiments, the user input detector 404a, 404b detects, receives, and/or facilitates user input in any suitable manner. In some examples, the user input detector 404a, 404b detects one or more user interactions with respect to the user interface. As referred to herein, a "user interaction" means a single interaction, or combination of interactions, received from a user by way of one or more input devices. For example, the user input detector 404a, 404b detects a user interaction from a keyboard, mouse, touch page, touch screen, and/or any other input device. In the event the broadcasting client device 102 and/or the viewer client device 106 includes a touch screen, the user input detector 404a, 404b, respectively, detects one or more touch gestures (e.g., swipe gestures, tap gestures, pinch gestures, reverse pinch gestures) from a user that forms a user interaction. In some examples, a user can provide the touch gestures in relation to and/or directed at one or more graphical objects or graphical elements of a user interface.

The user input detector 404a, 404b may additionally, or alternatively, receive data representative of a user interaction. For example, the user input detector 404a, 404b may receive one or more user configurable parameters from a user, one or more commands from the user, and/or any other suitable user input. The user input detector 404a, 404b may receive input data from one or more components of the social networking system 112, or from one or more remote locations.

The social networking system application 104, 108 performs one or more functions in response to the user input detector 404a, 404b detecting user input and/or receiving other data. Generally, a user can control, navigate within, and otherwise use the social networking system application 104, 108 by providing one or more user inputs that the user input detector 404a, 404b can detect. For example, in response to the user input detector 404a, 404b detecting user input, one or more components of the social networking system application 104, 108 allow a social networking system user to scroll through a newsfeed. In another example, in response to the user input detector 404a, 404b detecting user input, one or more components of the social networking system application 104, 108 allow the user to interact with a call to action.

In at least one embodiment, the user input detector 404a, 404b determines whether a detected user interaction is in connection with a call-to-action element. For example, as described above, one or more of the call to action provide a call-to-action element with which a viewer can interact using various touch gestures in connection (e.g., tap the element, swipe the element, etc.). Accordingly, the user input detector 404a, 404b can determine when, for example, a viewer's tap touch gesture is over a target area associated with a displayed call-to-action element. In response to determining that the touch gesture is within a target area associated with a displayed call-to-action element, the user input detector 404a, 404b can report a timestamp for the successful touch gesture to the call-to-action manager 410. In additional or alternative embodiments, the user input detector 404a, 404b can report a timestamp for any touch gesture detected while a call to action is active in combination with a live video stream (e.g., for unsuccessful interactions).

As shown in FIG. 4, and as mentioned above, the social networking system application 104, 108 also includes the data storage 406a, 406b. The data storage 406a, 406b includes social networking system data 408a, 408b. In one or more embodiments, the social networking system data 408a, 408b is representative of social networking system data information, such as described herein.

Also as shown in FIG. 4, and as mentioned above, the server 110 hosts the social networking system 112. The social networking system 112 provides social networking system posts, electronic messages, structured objects, and so forth to one or more users of the social networking system 112 (e.g., by way of a profile, a newsfeed, a communication thread, a timeline, a "wall", or any other type of graphical user interface). For example, one or more embodiments provide a user with a social networking system newsfeed containing posts from one or more co-users associated with the user (e.g., "friends"), as well as structured objects and other advertisements.

In one or more embodiments, a social networking system user scrolls through the social networking system newsfeed in order to view recent social networking system posts submitted by the one or more co-users associated with the user via the social networking system 108. In one embodiment, the social networking system 112 organizes the social networking system posts chronologically in a user's social networking system newsfeed or wall. In alternative embodiments, the social networking system 112 organizes the social networking system posts geographically, by interest groups, according to a relationship coefficient between the user and the co-user, etc. Additionally, in one or more embodiments, the user can download a copy of the social networking system newsfeed as a record of the social networking system posts displayed thereon.

The social networking system 112 also enables the user to engage in all other types of social networking system activity. For example, the social networking system 112 enables a social networking system user to scroll through newsfeeds, click on posts and hyperlinks, view and save offers, compose and submit electronic messages and posts, interact with structured objects, and so forth.

As mentioned above, "structured data" can include any data that is structured into specific groups, fields, or categories, and/or is associated with a defined call to action. For example, structured data can include metadata associated with node and edge information related to a call to action settings, information related to a broadcaster associated with the call to action, and interaction information related to the call to action within the social networking system 112. Furthermore, structured data associated with a benefit can include formatting information, the benefit author's name and location, content of the benefit, expiration information related to the benefit, or any other specific types of information/data associated with the benefit. The structured data may also include various multimedia content such as images (e.g., digital pictures, digital map images), video audio, etc. Using this structured data, the social networking system 112 can facilitate the insertion of structured objects within a newsfeed, a listing, or elsewhere.

As mentioned above, and as shown in FIG. 4, the social networking system 112 includes the call-to-action manager 410. In one or more embodiments, the call-to-action manager 410 handles all tasks associated with configuring, generating, and utilizing benefits. Additionally, the call-to-action manager 410 handles all tasks associating with configuring, generating, and providing a call to action. For example, as shown in FIG. 4, the call-to-action manager 410 includes a benefit settings manager 412 and a call-to-action settings manager 414.

The benefit settings manager 412 receives benefit configurations from a broadcaster via one or more GUIs as described above. For example, as described with reference to FIG. 2A, the benefit settings manager 412 provides one or more GUIs (e.g., the create a benefit GUI 202) including various controls that enable a social networking system user to enter configuration information for a benefit. Upon submitting benefit configuration information, and in response to the user selecting the create benefit button 206b, the benefit settings manager 412 generates a structured benefit object associated with the submitted configuration information. For example, the benefit settings manager 412 generates the structured benefit object by generating a structured object within the social graph 426 that includes the submitted configuration information and associates the structured object with the social networking system user who submitted the configuration information.

In addition to generating the structured benefit object, the benefit settings manager 412 also maintains the structured benefit object in accordance with the submitted configuration information. For example, in one or more embodiments, part of the submitted configuration information includes expiration information that details how long and under what circumstances a benefit is valid. To illustrate, a particular benefit may give social networking system users free shipping on all goods from a particular retailer for the next five days. Accordingly, after five days from the creation of the benefit, the benefit settings manager 412 will update the status of the benefit to reflect that the benefit is now expired. In other examples, the benefit creator may only want the benefit to be made available to a maximum number of social networking system users. Accordingly, after the benefit has been claimed by or awarded to the maximum number of social networking system users, the benefit settings manager 412 can update the status of the benefit to reflect that the benefit is no longer available.

As mentioned above, the call-to-action manager 410 also includes the call-to-action settings manager 414. In one or more embodiments, the call-to-action settings manager 414 provides one or more GUIs including various input controls whereby a broadcaster can configure call-to-action characteristics and trigger settings (e.g., the call to action configuration GUI 214, as shown in FIG. 2B). For example, as discussed above, the call-to-action manager 410 can receive call-to-action characteristics as well as trigger settings associated with the call to action via the one or more provided GUIs.

In response to the broadcaster indicating that the call to action configurations are complete (e.g., by starting the live video stream via the start live video button 226), the call-to-action settings manager 414 initiates the call to action in combination with the live video stream. For example, the call-to-action settings manager 414 renders one or more call-to-action elements associated with the configured call to action, and overlays the rendered elements on the live video stream. In alternative embodiments, rather than overlaying the rendered elements, the call-to-action settings manager 414 can embed the rendered elements within the live video stream.

The call-to-action settings manager 414 can then present the rendered call-to-action elements according to the defined call-to-action characteristics. For example, if the call-to-action characteristics dictate that the call to action is a "Tap the Surprise" interaction, the call-to-action settings manager 414 displays the call-to-action element according to the rules of the "Tap the Surprise" interaction. Further, the call-to-action settings manager 414 displays the call-to-action element at the difficulty level specified by the call-to-action characteristics.

As mentioned above, the configured call-to-action characteristics and trigger settings can encompass multiple benefits in connection with the same call to action. For example, the broadcaster can configure a "Tap the Surprise" call to action, and a "Swipe in the Direction of the Arrow" call-to-action type in connection with the same call to action. Further the broadcaster can set each call-to-action type to award different benefits at different points during the live video stream. Accordingly, the call-to-action settings manager 414 can enable all above-described call-to-action characteristics and trigger settings in connection with the live video stream.

As described above, the broadcaster may select audience demographics that define which live video stream viewers will receive the call to action. Accordingly, the call-to-action settings manager 414 identifies the audience corresponding to the submitted demographic information. In at least one embodiment, the call-to-action settings manager 414 identifies the relevant audience for a call to action by accessing social networking system information for each viewer of the live video stream. For example, for each live video stream viewer, the call-to-action settings manager 414 identifies profile information, account information, social networking system activity history, and friends' social networking system information.

In one or more embodiments, the call-to-action settings manager 414 identifies the relevant audience using the accessed social networking system information by utilizing one or more of machine learning, natural language processing, keyword analysis, and so forth. For example, the call-to-action settings manager 414 can utilize natural language processing in connection with a viewer's status update post stating, "Phoenix is a great new place to live," along with the viewer's recent check-ins to determine that the viewer lives in Phoenix, even if this is not indicated by the viewer's social networking system profile. Thus, in response to demographic settings associated with a call to action that specify an audience for users who live in the Southwest, the call-to-action settings manager 414 can determine that the viewer who lives in Phoenix will be included in the relevant audience.

Additionally, the call-to-action settings manager 414 identifies one or more benefit winners associated with each call to action. For example, as described above, the broadcaster can configure the call to action to be an interaction where viewers must perform a certain touch gesture in connection with a displayed call-to-action element in order to win. Thus, as described above, the user input detector 404b of the viewer client device 106 determines when a detected touch gesture is within a target area associated with the displayed call-to-action element and reports a timestamp to the call-to-action settings manager 414 for a winning touch gesture. Thus, the call-to-action settings manager 414 can determine that the viewer associated with the earliest winning touch gesture is the winner of the benefit associated with the call to action.

In at least one embodiment, the call-to-action settings manager 414 can also handle a multiple winner situation related to a call to action. For example, it is possible that more than one viewer correctly interacted with a displayed call-to-action element at the same time such that the call-to-action settings manager 414 receives more than one winning timestamp report for the exact same time. In that case, the call-to-action settings manager 414 can handle the multiple winner scenario in accordance with the configuration settings for the call to action, as described above.

For instance, if the call to action configurations specify that all of the multiple winners are allowed, the call-to-action settings manager 414 can award the benefit associated with the call to action to all of the winners. If the call to action configurations specify that only one winner is allowed, the call-to-action settings manager 414 can randomly select a single winner from the group of multiple winners. When the call-to-action system 100 provides more than one call to action during a live video stream, the call-to-action settings manager 414 can allow for multiple winners in connection with one call to action, but only allow for a single winner in connection with another call to action.

In at least one embodiment, the call-to-action settings manager 414 can also change the appearance of a displayed call-to-action element in response to a viewer qualifying for a benefit associated with a call to action. For example, as described above, if a viewer correctly taps on the birthday present in the "Tap the Surprise" call to action, the birthday present call-to-action element appears to open and release stars. Accordingly, in one or more embodiments, in response to determining that a viewer has correctly interacted with a call-to-action element, the call-to-action settings manager 414 can play an animation associated with the call-to-action element and/or replace the call-to-action element with a different display element.

Additionally, the call-to-action settings manager 414 generates notifications in response to a call to action. For example, based on the call to action configuration settings, the call-to-action settings manager 414 can generate encouraging notifications (e.g., as shown in FIG. 3B) when a viewer fails to win the call to action (e.g., does not tap quickly enough, etc.). In order to generate an encouraging notification, the call-to-action settings manager 414 can identify a time when the next benefit associated with the call to action will be released (e.g., "The next surprise will be released in just 5 minutes!"), or an engagement level at which the next benefit associated with the call to action will be released (e.g., "The next surprise will be released after we get another 5 viewers tuned in!").

Further, the call-to-action settings manager 414 generates congratulatory notifications for one or more viewers who win a call to action. For example, as described above, in response to determining one or more viewers have correctly interacted with a displayed call-to-action element, the call-to-action settings manager 414 can generate a notification informing each winning viewer (e.g., "You won!"). Regardless of the type of notification, the call-to-action settings manager 414 generates the notification such that the display of the live video stream is not obscured by the notification.

The call-to-action settings manager 414 also determines when the call to action is triggered. For example, if the call to action settings specify that the call to action is triggered by a user interaction, the call-to-action settings manager 414 provides a display element that the broadcaster can select in order to trigger the call to action. If the call to action settings specify that the call to action is triggered by a time trigger, the call-to-action settings manager 414 can trigger the call to action at the appropriate time. If the call to action settings specify that the call to action is triggered by an engagement level trigger, the call-to-action settings manager 414 triggers the call to action when the appropriate engagement level has been reached. Additionally, as described above, in the event that the call to action settings specify multiple call to action interactions, benefits, etc. the call-to-action settings manager 414 can appropriate trigger each associated call-to-action element associated with the multiple call to action interactions, benefits, and so forth.

In one or more embodiments, the call-to-action settings manager 414 also grants access to third-parties based on configured call to action settings related to sponsors or other authorized users. For example, in response to the broadcaster specifying a sponsor for the call to action (e.g., the sponsor may be a merchant who is offering a pair of free basketball shoes as a benefit associated with the call to action, the call-to-action settings manager 414 can provide a display element within a GUI presented to the sponsor (e.g., a button) that when selected by the sponsor triggers the call to action. In at least one embodiment, the call-to-action settings manager 414 can suggest an authorized third party to the broadcaster based on information associated with the benefit associated with the call to action.

In response to identifying one or more winners of a call to action, the call-to-action settings manager 414 next awards one or more benefits associated with the call to action. For example, the call to action settings associated with a "Tap the Surprise" interaction may specify that winners are awarded a benefit including 10% off the purchase of two or more T-shirts at a particular retailer. As described above, in order to associate this benefit with the call to action, the broadcaster must have previously configured the benefit for the benefit settings manager 412 to generate a structured benefit object. Accordingly, in order to award the benefit to a winning viewer, the call-to-action settings manager 414 associates the structured benefit object corresponding to the benefit for the call to action with the social networking system account of the viewer. Thus, when the live video stream ends, the social networking system 112 can inform the viewer that a new benefit has been associated with his account.

As shown in FIG. 4, the social networking system 112 also includes a live video manager 416. In one or more embodiments, the live video manager 416 handles all action involved in supporting a live video stream. For example, as shown in FIG. 4, the live video manager 416 includes the live video engine 418. In at least one embodiment, the live video engine 418 receives configuration settings from a broadcaster regarding an upcoming live video stream and hosts the live video stream according to those configuration settings. Additionally, the live video engine 418 displays the live video stream to one or more viewers via the social networking system 112.

Also as shown in FIG. 4, the social networking system 112 further includes data storage 420 associated with the call-to-action system 100. For example, as shown in FIG. 4, the data storage 420 stores benefit data 422 and call to action data 424. In one or more embodiments, benefit data 422 includes benefit information, such as described above. Similarly, in one or more embodiments, call to action data 424 includes call to action information, such as described above.

FIGS. 1-4, the corresponding text, and the examples, provide a number of different methods, systems, and devices for identifying offers in social networking system posts utilizing the call-to-action system 100. In addition to the foregoing, one or more embodiments can also be described in terms of flowcharts comprising acts in a method for accomplishing a particular result. For example, FIG. 5 may be performed with less or more acts or the acts may be performed in differing orders. Additionally, the acts described herein may be repeated or performed in parallel with one another or in parallel with different instances of the same or similar acts.

Figure 5:
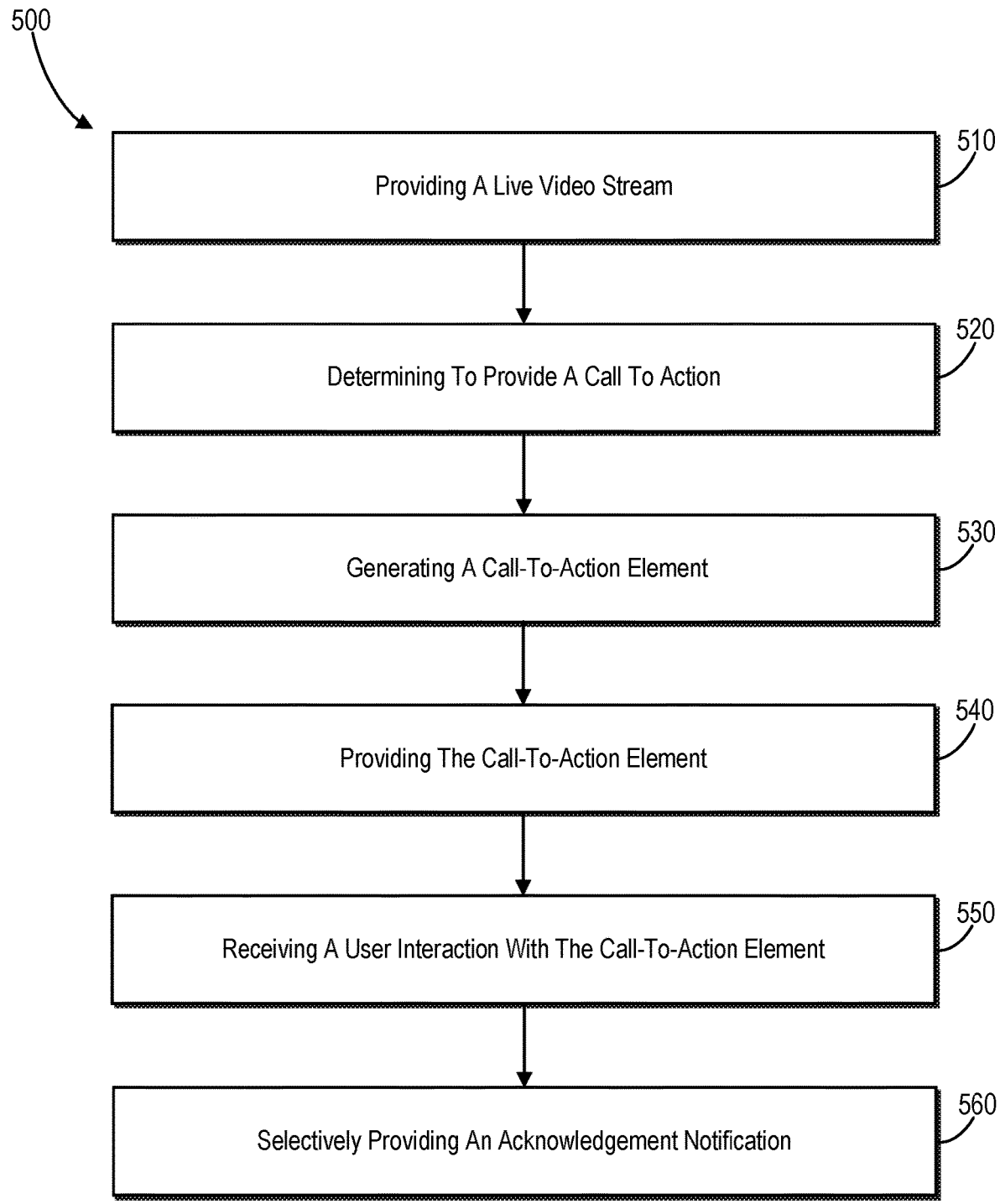
FIG. 5 illustrates a flowchart of a series of acts in a method of providing a call to action in connection with a live video stream in accordance with one or more embodiments.

FIG. 5 illustrates a flowchart of one example method 500 of providing a call to action in connection with a live video stream. The method 500 includes an act 510 of providing a live video stream. In particular, the act 510 involves providing, to a plurality of viewer client devices, a live video stream received from a broadcaster client device.

Additionally, the method 500 includes an act 520 of determining to provide a call to action. In particular, the act 520 involves determining to provide a call to action with the live video stream, wherein the call to action is associated with one or more call-to-action characteristics. In at least one embodiment, the method 500 further includes an act of receiving a trigger setting, wherein the trigger setting comprises one or more of a predefined time trigger, a user interaction trigger, and a predefined engagement level trigger. Furthermore, in at least one embodiment, the method 500 includes an act of determining that the trigger setting is satisfied, and wherein determining to provide a call to action with the live video stream is in response to the determination that the trigger setting is satisfied.

For example, in one embodiment, the method 500 includes identifying an occurrence of a time corresponding to the predefined time trigger. In some embodiments, the predefined time trigger comprises one or more of a defined time of day, a defined amount of time from an initiation of the live video stream, or a defined amount of time from providing a previous call-to-action element. In another example, the method 500 includes receiving a user interaction that corresponds with the user interaction trigger, wherein the user interaction that corresponds with the user interaction trigger comprises one of a user interaction from the broadcaster client device, or a user interaction from an authorized client device. In yet another example, the method 500 includes identifying an engagement level that meets the predefined engagement level trigger, wherein the identified engagement level includes one or more of a number of views, a number of likes, and a number of comments.

The method 500 also includes an act 530 of generating a call-to-action element. In particular, the act 530 involves generating a call-to-action element comprising the one or more call-to-action characteristics. For example, in at least one embodiment, the method 500 includes an act of receiving a plurality of call-to-action characteristics, wherein the plurality of call-to-action characteristics comprises one or more of a type associated with the call to action, an appearance specification for the call-to-action element, a difficulty level associated with the call-to-action element, demographic specifications associated with the call-to-action element, or frequency information associated with the call-to-action element. In that case, generating a call-to-action element includes generating a selectable visual element according to an appearance specification within the plurality of call-to-action characteristics.

Furthermore, the method 500 includes an act 540 of providing the call-to-action element. In particular, the act 540 involves providing, to the plurality of viewer client devices, the call-to-action element for presentation with the live video stream. For example, in at least one embodiment, the method 500 includes an act of providing, to the plurality of viewer client devices, a reaction stream with the live video stream, wherein providing the call-to-action element includes inserting the call-to-action element into the reaction stream.

The method 500 also includes an act 550 of receiving a user interaction with the call-to-action element. In particular, the act 550 involves receiving, from one or more viewer client devices from the plurality of viewer client devices, one or more indications of user interactions with the call-to-action element. For example, in one or more embodiments, receiving one or more indications of user interactions with the call-to-action element includes receiving one or more indications of touch gestures provided with respect to the call-to-action element. In at least one embodiment, the method 500 includes the steps of receiving, from one or more viewer client devices, a plurality of timestamps associated with viewer touch gestures, and generating, based on the received plurality of timestamps, the acknowledgment notification. In some embodiments, generating the acknowledgment notification further comprises including an indication of a benefit associated with the call to action within the acknowledgment notification. In additional or alternative embodiments, generating the acknowledgement notification includes: identifying a plurality of timestamps, wherein each of the plurality of timestamps is associated with one of the one or more indications of user interactions with the call-to-action element; identifying an earliest timestamp within the plurality of timestamps; and generating a congratulatory notification for the viewer client device that sent the indication of the user interaction associated with the earliest timestamp.

The method 500 further includes an act 560 of selectively providing an acknowledgement notification. In particular, the act 560 involves, based on the received one or more indications of user interaction, selectively providing, to a portion of viewer client devices from the one or more viewer client devices, an acknowledgment notification corresponding to the call to action. For example, in at least one embodiment, selectively providing, to the portion of viewer client devices from the one or more viewer client devices, the acknowledgement notification corresponding to the call to action includes providing the live video stream in a first portion of a display and providing the acknowledgement notification in a second portion of the display.

In one or more embodiments, the method 500 also includes acts of receiving one or more randomization settings associated with the call to action; based on the one or more indications of user interaction with the call-to-action element, determining that at least two of the one or more indications of user interaction are associated with a time stamp indicating simultaneous user interactions with the call-to-action element; and based on the randomization settings, identifying the portion of viewer client devices to which to provide the acknowledgement notification. Furthermore, in at least one embodiment, the method 500 further includes an act of, associating a structured benefit object with a social networking system account for each viewer associated with each client device of the portion of viewer client devices. Additionally, in some embodiments, the method 500 includes an act of providing a social networking notification to a social networking account for each viewer associated with each client device of the portion of viewer client devices, wherein the social networking notification indicates a benefit associated with the call to action.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
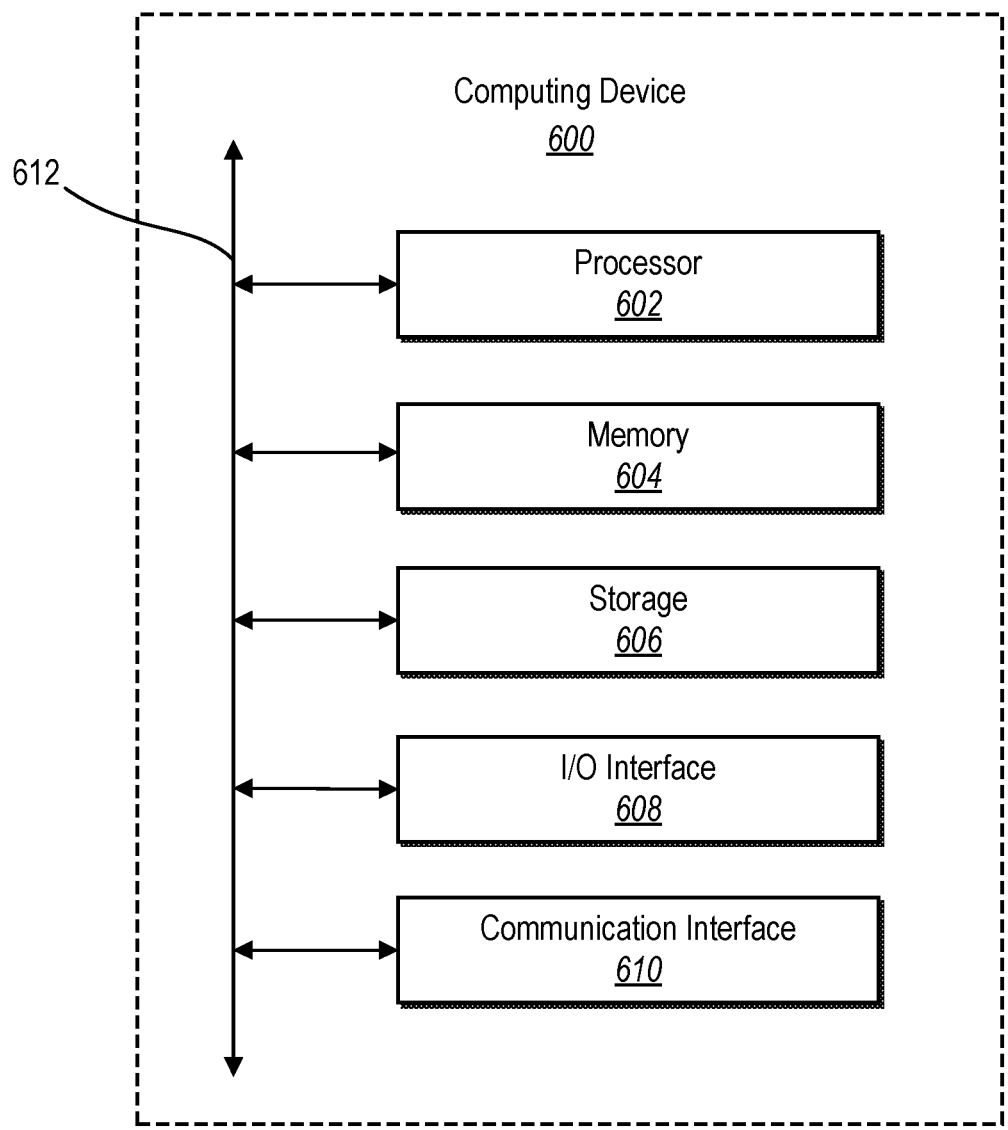
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the call-to-action system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the call-to-action system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example, and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similar to events, the calendar entries may include times, dates, locations and identities of other users.

Figure 7:
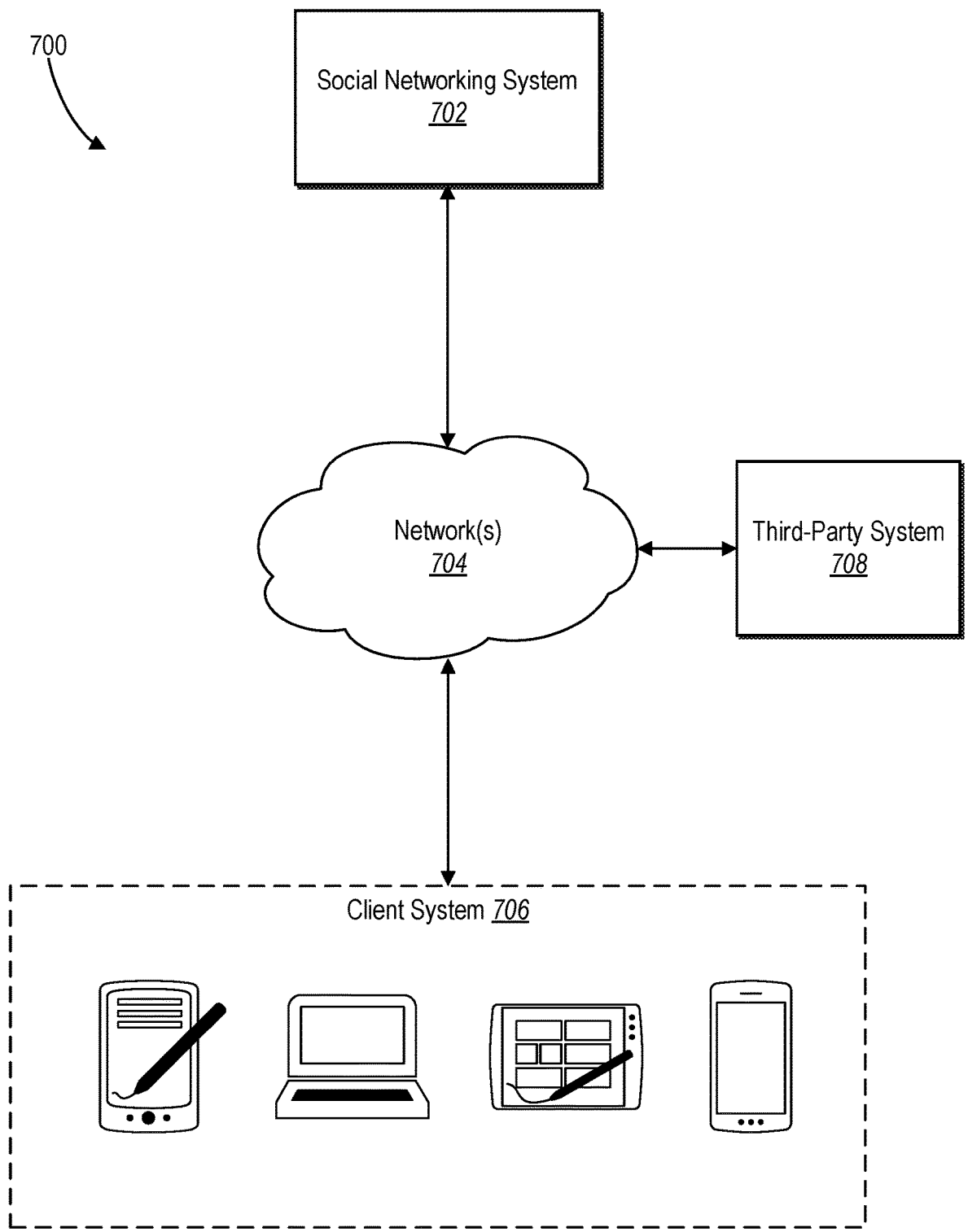
FIG. 7 is an example network environment of a social networking system in accordance with one or more embodiments.

FIG. 7 illustrates an example network environment 700 of a social networking system. Network environment 700 includes a client device 706, a social networking system 702, and a third-party system 708 connected to each other by a network 704. Although FIG. 7 illustrates a particular arrangement of client device 706, social networking system 702, third-party system 708, and network 704, this disclosure contemplates any suitable arrangement of client device 706, social networking system 702, third-party system 708, and network 704. As an example and not by way of limitation, two or more of client device 706, social networking system 702, and third-party system 708 may be connected to each other directly, bypassing network 704. As another example, two or more of client device 706, social networking system 702, and third-party system 708 may be physically or logically co-located with each other in whole or in part. Moreover, although FIG. 7 illustrates a particular number of client devices 706, social networking systems 702, third-party systems 708, and networks 704, this disclosure contemplates any suitable number of client devices 706, social networking systems 702, third-party systems 708, and networks 704. As an example and not by way of limitation, network environment 700 may include multiple client device 706, social networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client device 706, social networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 706. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client device 706 one or more Hyper Text Markup Language (HTML) files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social-networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a social networking system 702, or a third-party system 708 to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of third-party system 708, which is separate from social networking system 702 and coupled to social networking system 702 via a network 704.

In particular embodiments, social networking system 702 may be capable of linking a variety of entities. As an example and not by way of limitation, social networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social networking system 702. In particular embodiments, however, social networking system 702 and third-party systems 708 may operate in conjunction with each other to provide social-networking services to users of social networking system 702 or third-party systems 708. In this sense, social networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example and not by way of limitation, a user communicates posts to social networking system 702 from a client device 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client devices 706 or one or more third-party system 708 via network 704. The web server may include a mail server or other messaging functionality for receiving and routing messages between social networking system 702 and one or more client devices 706. An API-request server may allow a third-party system 708 to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
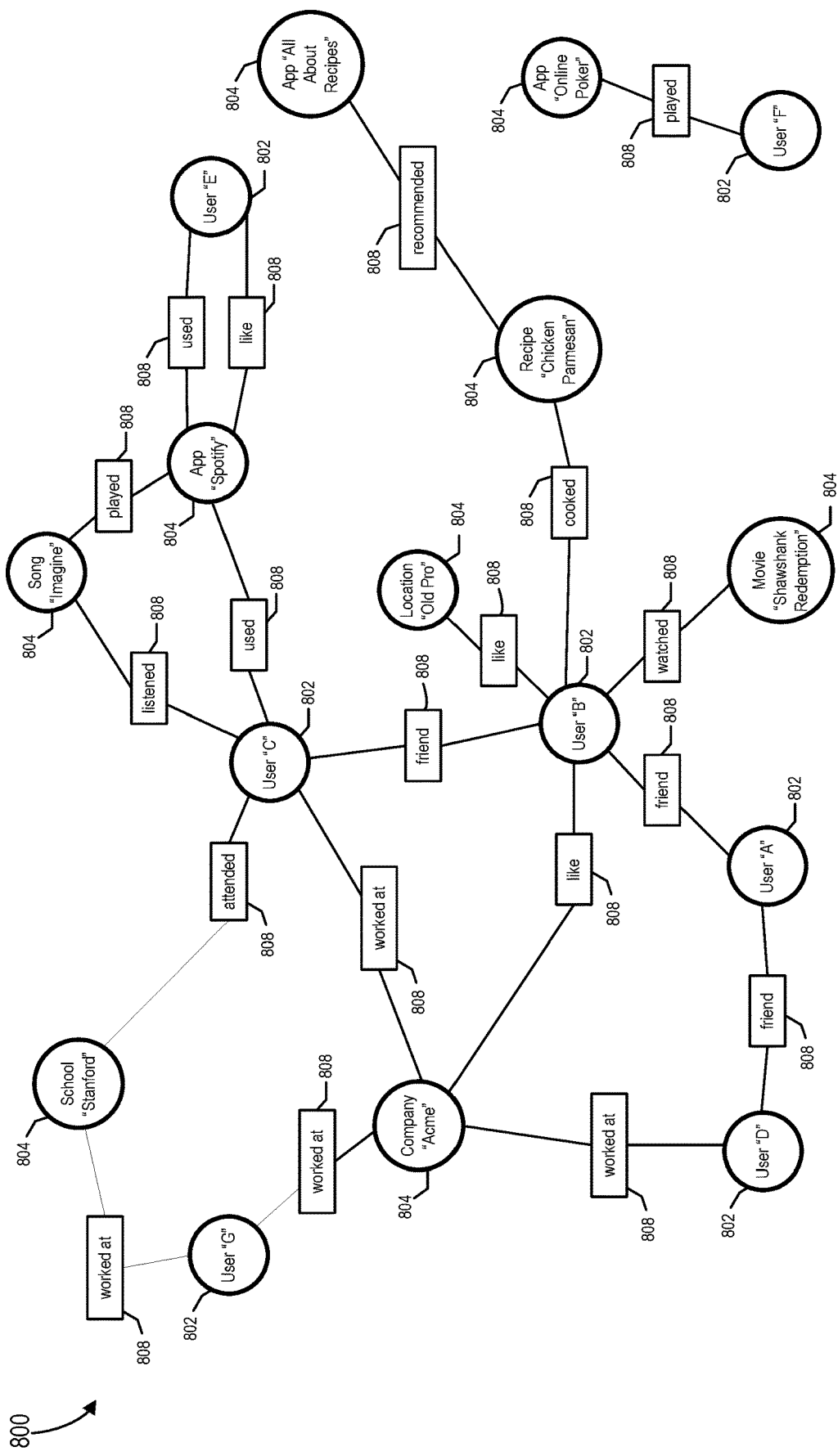
FIG. 8 illustrates a social graph in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party server 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 706 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept node 804 by clicking or selecting a "Like" icon, which may cause the user's client device 706 to send to social networking system 702 a message indicating the user's liking of the concept associated with the concept-profile page. In response to the message, social networking system 702 may create an edge 806 between user node 802 associated with the user and concept node 804, as illustrated by "like" edge 806 between the user and concept node 804. In particular embodiments, social networking system 702 may store an edge 806 in one or more data stores. In particular embodiments, an edge 806 may be automatically formed by social networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user node 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 706 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client device 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
providing, to a plurality of viewer client devices, a live video stream received from a broadcaster client device;
generating a reaction stream comprising one or more reaction elements associated with one or more viewers of the live video stream;
embedding the reaction stream into the live video stream such that the one or more reaction elements appear to float across a presentation of the live video stream on each viewer client device of the plurality of viewer client devices;
determining, by at least one processor, to provide a selectable call-to-action element positioned within the reaction stream embedded in the live video stream, wherein the selectable call-to-action element is associated with a benefit awardable to one or more users that select the selectable call-to-action element;
generating the selectable call-to-action element associated with the benefit;
providing, to the plurality of viewer client devices, the selectable call-to-action element inserted among the one or more reaction elements positioned within the reaction stream embedded in the live video stream such that the selectable call-to-action element also appears to float across the live video stream with the one or more reaction elements, the reaction elements positioned separately from an engagement display portion designated for viewer comments;
receiving, from one or more viewer client devices from the plurality of viewer client devices, one or more indications of user interaction with the selectable call-to-action element; and
based on the one or more indications of user interaction, selectively providing, to a portion of viewer client devices from the one or more viewer client devices, an acknowledgment notification corresponding to the selectable call-to-action element.

2. The method as recited in claim 1, further comprising receiving a trigger setting, wherein the trigger setting comprises one of a predefined time trigger, a user interaction trigger, or a predefined engagement level trigger.

3. The method as recited in claim 2, further comprising determining that the trigger setting is satisfied, and wherein determining to provide the selectable call-to-action element positioned within the reaction stream embedded in the live video stream is in response to the determination that the trigger setting is satisfied.

4. The method as recited in claim 2, further comprising identifying an occurrence of a time corresponding to the predefined time trigger.

5. The method as recited in claim 4, wherein the predefined time trigger comprises one or more of a defined time of day, a defined amount of time from an initiation of the live video stream, or a defined amount of time from providing a previous selectable call-to-action element.

6. The method as recited in claim 2, further comprising receiving a user interaction that corresponds with the user interaction trigger, wherein the user interaction that corresponds with the user interaction trigger comprises one of a user interaction from the broadcaster client device or a user interaction from an authorized client device.

7. The method as recited in claim 2, further comprising identifying an engagement level that meets the predefined engagement level trigger, wherein the identified engagement level comprises one or more of a number of views, a number of likes, or a number of comments.

8. The method as recited in claim 1, further comprising receiving a plurality of call-to-action characteristics, wherein the plurality of call-to-action characteristics comprises one or more of a type associated with the selectable call-to-action element, an appearance specification for the selectable call-to-action element, a difficulty level associated with a potential viewer interaction with the selectable call-to-action element, demographic specifications associated with the selectable call-to-action element, or frequency information associated with the selectable call-to-action element.

9. The method as recited in claim 8, wherein generating the selectable call-to-action element comprises generating a selectable visual element according to an appearance specification within the plurality of call-to-action characteristics.

10. The method as recited in claim 1, wherein receiving the one or more indications of user interaction with the selectable call-to-action element comprises receiving one or more indications of a touch gesture provided with respect to the selectable call-to-action element.

11. A system comprising:
at least one processor; and
at least one non-transitory computer-readable storage medium storing instructions thereon that, when executed by the at least one processor, cause the system to:
provide, to a plurality of viewer client devices, a live video stream received from a broadcaster client device;
generate a reaction stream comprising one or more reaction elements associated with one or more viewers of the live video stream;
embed the reaction stream into the live video stream such that the one or more reaction elements appear to float across a presentation of the live video stream on each viewer client device of the plurality of viewer client devices;
determine to provide a selectable call-to-action element positioned within the reaction stream embedded in the live video stream, wherein the selectable call-to-action element is associated with a benefit awardable to one or more users that select the selectable call-to-action element;
generate the selectable call-to-action element comprising the benefit;
provide, to the plurality of viewer client devices, the selectable call-to-action element inserted among the one or more reaction elements positioned within the reaction stream embedded in the live video stream such that the selectable call-to-action element also appears to float across the live video stream with the one or more reaction elements, the reaction elements positioned separately from an engagement display portion designated for viewer comments;
receive, from one or more viewer client devices from the plurality of viewer client devices, one or more indications of user interactions with the selectable call-to-action element; and
based on the received one or more indications of user interaction, selectively provide, to a portion of viewer client devices from the one or more viewer client devices, an acknowledgment notification corresponding to the selectable call-to-action element.

12. The system as recited in claim 11, further comprising instructions thereon that, when executed by the at least one processor, cause the system to:
- identify, from one or more viewer client devices, a plurality of timestamps associated with each of the one or more indications of user interaction with the selectable call-to-action element;
- wherein selectively providing the acknowledgment notification to a portion of viewer client devices comprises selecting one or more viewers with which to provide the acknowledgement notification based on the plurality of timestamps.

13. The system as recited in claim 12, further comprising instructions thereon that, when executed by the at least one processor, cause the system to generate an acknowledgement notification, wherein generating the acknowledgement notification comprises:
- identifying an earliest timestamp within the plurality of timestamps;
- generating a congratulatory notification for the viewer client device that sent the indication of the user interaction associated with the earliest timestamp.

14. The system as recited in claim 13, further comprising instructions thereon that, when executed by the at least one processor, cause the system to add an indication of the benefit associated with the selectable call-to-action element within the acknowledgment notification.

15. The system as recited in claim 14, further comprising instructions thereon that, when executed by the at least one processor, cause the system to:
- provide, to each viewer client device from the portion of viewer client devices, the live video stream for presentation within a first portion of a graphical user interface; and
- wherein selectively providing the acknowledgement notification comprises providing, to each viewer client device from the portion of viewer client devices, the acknowledgement notification for presentation within a second portion of the display.

16. The system as recited in claim 15, wherein generating the acknowledgement notification comprises:
- identifying an earliest timestamp within the plurality of timestamps;
- generating a congratulatory notification for the viewer client device that sent the indication of the user interaction associated with the earliest timestamp.

17. A non-transitory computer-readable medium storing instructions thereon that, when executed by at least one processor, cause a computer system to:
- provide, to a plurality of viewer client devices, a live video stream received from a broadcaster client device;
- generate a reaction stream comprising one or more reaction elements associated with one or more viewers of the live video stream;
- embed the reaction stream into the live video stream such that the one or more reaction elements appear to float across a presentation of the live video stream on each viewer client device of the plurality of viewer client devices;
- determine to provide a selectable call-to-action element positioned within the reaction stream embedded in the live video stream, wherein the selectable call-to-action element is associated with a benefit awardable to one or more users that select the selectable call-to-action element;
- generate the selectable call-to-action element comprising the benefit;
- provide, to the plurality of viewer client devices, the selectable call-to-action element inserted among the one or more reaction elements positioned within the reaction stream embedded in the live video stream such that the selectable call-to-action element also appears to float across the live video stream with the one or more reaction elements, the reaction elements positioned separately from an engagement display portion designated for viewer comments;
- receive, from one or more viewer client devices from the plurality of viewer client devices, one or more indications of user interactions with the selectable call-to-action element; and
- based on the received one or more indications of user interaction, selectively provide, to a portion of viewer client devices from the one or more viewer client devices, an acknowledgment notification corresponding to the selectable call-to-action element.

18. The non-transitory computer-readable medium as recited in claim 17, further comprising instructions thereon that, when executed by at least one processor, cause a computer system to:
- receive one or more randomization settings associated with the selectable call-to-action element;
- based on the one or more indications of user interaction with the selectable call-to-action element, determine that at least two of the one or more indications of user interaction are associated with a time stamp indicating simultaneous user interactions with the selectable call-to-action element; and
- based on the randomization settings, identify the portion of viewer client devices to which to provide the acknowledgement notification.

19. The non-transitory computer-readable medium as recited in claim 18, further comprising instructions thereon that, when executed by at least one processor, cause a computer system to:
- associate a structured benefit object with a social networking system account for each viewer associated with each client device of the portion of viewer client devices; and
- provide a social networking notification to a social networking account for each viewer associated with each client device of the portion of viewer client devices, wherein the social networking notification indicates the benefit is associated with the selectable call-to-action element.

20. The non-transitory computer-readable medium as recited in claim 17, wherein receiving, from the one or more viewer client devices from the plurality of viewer client device, the one or more indications of user interactions with the selectable call-to-action element comprises receiving one or more indications of touch tap gestures on touch screen displays at a display location corresponding to the selectable call-to-action element.

* * * * *